(12) United States Patent
Saito

(10) Patent No.: US 6,623,404 B2
(45) Date of Patent: Sep. 23, 2003

(54) RESHIFT CONTROL SYSTEM FOR AUTOMATIC TRANSMISSION

(75) Inventor: Yuji Saito, Shizuoka (JP)

(73) Assignee: Jatco LTD, Fuji (JP)

( * ) Notice: Subject to any disclaimer, the term of this patent is extended or adjusted under 35 U.S.C. 154(b) by 0 days.

(21) Appl. No.: 09/954,298

(22) Filed: Sep. 18, 2001

(65) Prior Publication Data
US 2002/0035014 A1 Mar. 21, 2002

(30) Foreign Application Priority Data

Sep. 18, 2000 (JP) ........................ 2000-282325
Sep. 18, 2000 (JP) ........................ 2000-282333
Sep. 18, 2000 (JP) ........................ 2000-282339

(51) Int. Cl.$^7$ .......................... F16H 61/06; F16H 61/16
(52) U.S. Cl. ........................................ 477/143; 477/155
(58) Field of Search ............................... 477/125, 143, 477/155

(56) References Cited

U.S. PATENT DOCUMENTS

| | | | | |
|---|---|---|---|---|
| 4,955,257 | A | * 9/1990 | Terayama et al. | 477/155 |
| 5,658,219 | A | * 8/1997 | Kondo et al. | 477/122 |
| 5,941,795 | A | * 8/1999 | Tsuchiya et al. | 477/143 |
| 6,254,508 | B1 | * 7/2001 | Kojima et al. | 477/109 |

FOREIGN PATENT DOCUMENTS

| | | |
|---|---|---|
| JP | 2-46352 | 2/1990 |
| JP | 8-277925 | 10/1996 |
| JP | 8-338516 | 12/1996 |

OTHER PUBLICATIONS

U.S. patent application Ser. No. 09/936,811, Murasugi et al., filed Sep. 18, 2001.
U.S. patent application Ser. No. 09/953,893, Tanaka et al., filed Sep. 18, 2001.
U.S. patent application Ser. No. 09/953,895, Saito, filed Sep. 18, 2001.
U.S. patent application Ser. No. 09/953,936, Kato, filed Sep. 18, 2001.
U.S. patent application Ser. No. 09/953,937, Saito, filed Sep. 18, 2001.
U.S. patent application Ser. No. 09/953,966, Saito, filed Sep. 18, 2001.
U.S. patent application Ser. No. 09/953,967, Saito, filed Sep. 18, 2001.
U.S. patent application Ser. No. 09/953,968, Saito, filed Sep. 18, 2001.
U.S. patent application Ser. No. 09/953,969, Saito, filed Sep. 18, 2001.
U.S. patent application Ser. No. 09/953,972, Saito, filed Sep. 18, 2001.
U.S. patent application Ser. No. 09/954,017, Murasugi et al., filed Sep. 18, 2001.
U.S. patent application Ser. No. 09/954,019, Saito, filed Sep. 18, 2001.

* cited by examiner

*Primary Examiner*—Sherry Estremsky
(74) *Attorney, Agent, or Firm*—Foley & Lardner

(57) ABSTRACT

When a reshift request for a second shift to a second gear ratio is produced during a first shift operation to a first gear ratio in an automatic transmission, a reshift control apparatus performs a reshift operation in response to the reshift request in a first reshift control mode by terminating the first shift operation at an intermediate state without completing the first shift operation, and instead initiating the second shift operation from an intermediate state.

22 Claims, 17 Drawing Sheets

FIG.2

|  | R/C | H/C | L/C | LR/B | L/OWC | 2-4/B |
|---|---|---|---|---|---|---|
| 1st |  |  | ◯ | ◌ | ◯ |  |
| 2nd |  |  | ◯ |  |  | ◯ |
| 3rd |  | ◯ | ◯ |  |  |  |
| 4th |  | ◯ |  |  |  | ◯ |
| Rev | ◯ |  |  | ◯ |  |  |

RESHIFT CONTROL SYSTEM FOR AUTOMATIC TRANSMISSION

BACKGROUND OF THE INVENTION

The present invention relates to a technique for inhibiting and permitting a reshift if a reshift request is produced during another shift operation in an automatic transmission.

A reshift operation responsive to a reshift request produced during a first shift operation tends to cause shift shock or prolong the process of shift operation.

Published Japanese Patent Application Kokai Publication 8-338516; Published Japanese Patent Application Kokai Publication 8-277925; and Published Japanese Patent Application Kokai Publication 2-46352 show various reshift control systems.

SUMMARY OF THE INVENTION

It is an object of the present invention to provide a reshift control apparatus and/or process capable of reducing shift shock and improving shift response.

According to the present invention, a reshift control apparatus for an automatic transmission comprising a friction element group of friction engaging elements to be selectively engaged and disengaged to select one of gear ratios, comprises a shift controller configured: to govern a first shift operation to achieve a first shift to an after-first-shift gear ratio by setting a first shift target engagement pressure to engage a first shift engagement side element which is one element of the friction element group to be engaged for the first shift, and a second shift operation to achieve a second shift to an after-second-shift gear ratio different from the after-first-shift gear ratio by setting a second shift target engagement pressure to engage a second shift engagement side element which is one element of the friction element group to be engaged for the second shift and a second shift target disengagement pressure to disengage a second shift disengagement side element which is one element of the friction element group to be disengaged for the second shift; to allow a reshift to initiate the second shift operation during the first shift operation initiated in response to a first shift command when a reshift request for the second shift is produced in a first stage of the first shift operation; to make an actual fluid pressure for the second shift engagement side element after the time of the reshift command, equal to the second shift target engagement pressure varied with time from an intermediate state reached if the second shift operation were initiated at the time of the first shift command in the case of the second shift engagement side element being the same as the first shift engagement side element; and to make an actual fluid pressure for the second shift disengagement side element after the time of the reshift command, equal to the second shift target disengagement pressure varied with time from an intermediate state reached if the second shift operation were initiated at the time of the first shift command.

According to the present invention, a reshift control system for a vehicle, comprises: an automatic transmission comprising a gear train and a friction element group to determine a torque path in the gear train, to select one of gear ratios; a condition sensor to sense an operating condition of the vehicle; and a shift controller to govern a first shift operation in the automatic transmission from a before-shift gear ratio to an after-first-shift gear ratio, and a second shift operation in the automatic transmission from the before-shift gear ratio to an after-second-shift gear ratio, to produce a reshift command to command the second shift operation during the first shift operation in accordance with the operating condition; and to perform a reshift operation in response to the reshift command by terminating the first shift operation at an intermediate state without completing the first shift operation, and instead initiating the second shift operation from an intermediate state.

A reshift control process according to the present invention, for a vehicle equipped with an automatic transmission comprising a gear train and a friction element group to determine a torque path in the gear train, to select one of gear ratios, the reshift control process comprising: a step of producing a reshift command to command a second shift operation in the automatic transmission from a before-shift gear ratio to an after-second-shift gear ratio during a first shift operation in the automatic transmission from the before-shift gear ratio to an after-first-shift gear ratio in accordance with an operating condition of the vehicle; and a step of performing a reshift operation in response to the reshift command by terminating the first shift operation at an intermediate state without completing the first shift operation, and instead initiating the second shift operation from an intermediate state.

A reshift control apparatus according another aspect of the invention, comprises a shift controller configured: to produce a reshift request for a reshift to initiate a second shift operation during a first shift operation; and to inhibit the reshift after an end of a loss stroke in a friction engagement element to be engaged in the first shift operation is detected.

A reshift control apparatus according to still another aspect of the invention, comprises a shift controller configured: to produce a reshift request for a reshift to initiate a second shift operation during a first shift operation; to delay a reshift operation if the reshift request is produced in a reshift inhibit stage of the first shift operation, until an elapse of a delay time from an end of the first shift operation; and to decrease the delay time with increase in a measured time from the instant of the reshift request to the instant of an inertia phase end at which an effective gear ratio expressed as a transmission input and output speed ratio reaches a level of the after-first-shift gear ratio.

The other objects and features of this invention will become understood from the following description with reference to the accompanying drawings.

BRIEF DESCRIPTION OF THE DRAWINGS

FIG. 2 is a table showing an engagement logic of friction engagement elements to select one of gear speeds in an automatic transmission shown in FIG. 1.

DETAILED DESCRIPTION OF THE INVENTION

Figure 1:
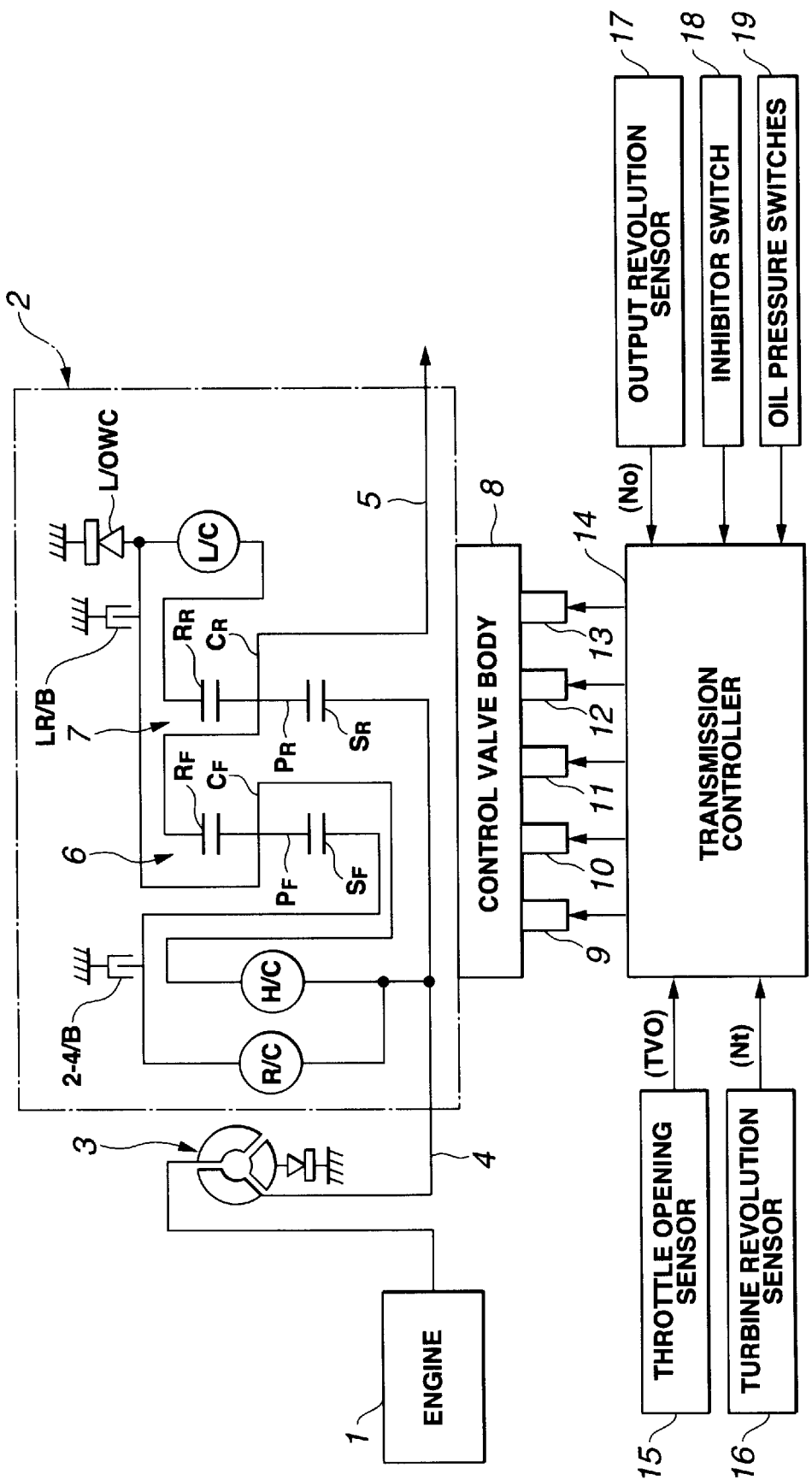
FIG. 1 is a schematic view showing a reshift control system according to a first embodiment of the present invention.

FIG. 1 shows a shift control system according to a first embodiment of the present invention, including an engine 1 and an automatic transmission 2.

In accordance with driver's depression of an accelerator pedal, a throttle valve varies its opening and thereby regulates the output of engine 1. Output rotation of engine 1 is transmitted through a torque converter 3 to an input shaft 4 of an automatic transmission 2.

In transmission 2, front and rear planetary gear sets 6 and 7 are mounted on input and output shafts 4 and 5 which are aligned end to end. Front planetary gear set 6 is located on a front side closer to engine 1. Front and rear planetary gear sets 6 and 7 are main components of a planetary speed change mechanism of automatic transmission 2.

Front planetary gear set 6 is a simple planetary gear set including a front sun gear $S_F$, a front ring gear $R_F$, front pinions $P_F$ engaging with the front sun and ring gears, and a front carrier $C_F$ supporting front pinions $P_F$ rotatably. Rear planetary gear set 7 is also a simple planetary gear set including a rear sun gear $S_R$, a rear ring gear $R_R$, rear pinions $P_R$ engaging with the rear sun and rear gears, and a rear carrier $C_R$ supporting rear pinions $PR_F$ rotatably.

As friction elements (or devices) to determine a drive path (or speed) in the planetary gear train, there are a low clutch L/C, a 2–4 speed brake 2–4/B, a high clutch H/C, a low reverse brake LR/B, a low one-way clutch L/OWC, and a reverse clutch R/C.

The reverse clutch R/C is connected between front sun gear $S_F$ and input shaft 4 to selectively connect the front sun gear $S_F$ with input shaft 4. The 2–4 brake 2–4/B is disposed between front sun gear $S_F$ and a casing to hold front sun gear $S_F$ selectively. The high clutch H/C is connected between front planet carrier $C_F$ and input shaft 4 for selective connection therebetween. The low one-way clutch L/OWC is disposed between front planet carrier $C_F$ and the casing to prevent reverse rotation of the front planet carrier $C_F$ opposite to the rotational direction of the engine. The low reverse brake LR/B is arranged to hold the front planet carrier $C_F$ selectively. The low clutch L/C is connected between front planet carrier $C_F$ and rear ring gear $R_R$ for selective connection therebetween. Output shaft 5 is connected with front ring gear $R_F$ and rear planet carrier $C_R$ which are connected together. Rear sun gear $S_R$ is connected with input shaft 4.

Figure 2:
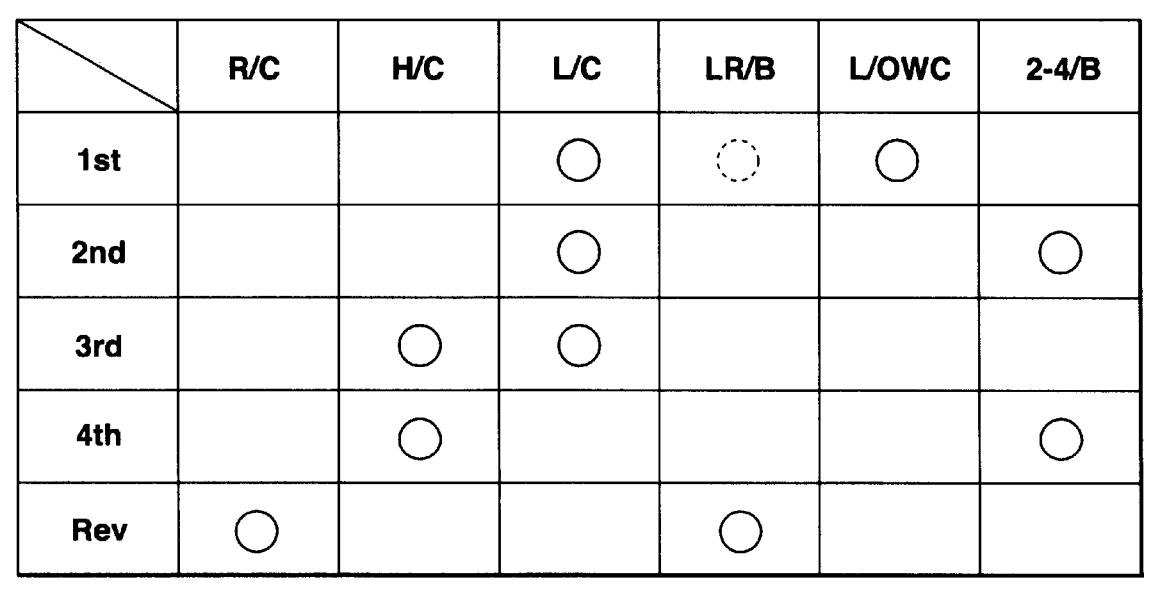

The thus-constructed planetary gear train can provide a first forward speed (1st), a second forward speed (2nd), a third forward speed (3rd), a fourth forward speed (4th) and a reverse speed (Rev), by selective oil pressure actuation (engagement) shown by solid line circles in FIG. 2 of the five friction elements R/C, H/C, L/C, LR/B, and 2–4/B, and self engagement of low one-way clutch L/OWC shown by a slid line circle. A broken line circle in FIG. 2 indicates oil pressure actuation (or engagement) to effect engine braking.

A control valve body 8 includes a hydraulic control circuit to achieve the engagement logic shown in FIG. 2, of the shift control friction elements L/C, 2–4/B, H/C, LR/B, and R/G. In addition to a manual valve (not shown), the control valve body 8 has a line pressure solenoid 9, a low clutch solenoid 10, a 2–4 speed brake solenoid 11, a high clutch solenoid 12 and a low reverse brake solenoid 13.

The line pressure solenoid 9 changes the line pressure as a source pressure of the shift control between high and low levels by its on and off operation. The manual valve is operated by the driver among a forward drive range position (D), a reverse range position (R), and park and stop range positions (P, N).

In D range, the manual valve supplies the above-mentioned line pressure as a D range pressure to the low clutch solenoid 10, the 2–4 brake solenoid 11, the high clutch solenoid 12 and the low reverse brake solenoid 13. Each of the solenoids 10~13 reduces the line pressure directed to the corresponding one of the low clutch L/C, the 2–4 speed brake 2–4/B, the high clutch H/C and the low reverse brake LR/B, in accordance with the solenoid pressure generated by the duty control from the above-mentioned D range pressure. Thus, the solenoids 10~13 can regulate the operating fluid pressures of these friction engagement elements individually, and the shift control system can achieve the engagement logic from first gear to fourth gear shown in FIG. 2 by the duty control of solenoids 10~13.

In R range, the manual valve delivers the line pressure directly to the reverse clutch R/C independently from the duty control of the solenoids, and supplies the pressure regulated from the line pressure as a source pressure by the corresponding solenoid to the low reverse brake LR/B. Thus, the engagement logic of reverse drive is achieved with the reverse clutch R/C and low reverse brake LR/B.

In P and N ranges, the manual valve is in a state supplying the line pressure to none of the circuits and thereby puts the automatic transmission in a neutral position, by disengaging all the friction elements.

A transmission controller 14 controls the line pressure solenoid 9 in the on/off control mode, and controls the low clutch solenoid 10, 2–4 speed brake solenoid 11, high clutch solenoid 12 and low reverse brake solenoid 13 in the duty control mode in accordance with input information supplied from the following input devices.

A throttle opening sensor 15 senses a throttle opening (degree) of the engine 1. A turbine revolution sensor (or input revolution sensor) 16 senses a turbine revolution speed Nt which is an output revolution speed of the torque converter 3 (i.e., the transmission input revolution speed). An output revolution sensor 17 senses a revolution speed No of the output shaft 5 of the automatic transmission 2. An inhibitor switch 18 senses a selected range.

Oil pressure switches 19 are disposed in engagement side friction elements to be engaged in interchange shifts. As shown in FIG. 2, the engagement side friction element is the high clutch H/C in the case of 2–3 shift from 2nd gear speed to 3rd gear speed, the 2–4 brake 2–4/B in the case of 3–2 shift, the 2–4 brake in the case of 3–4 shift, and the low clutch L/C in the case of 4–3 shift. The signals are supplied from oil pressure switches 19 to controller 14. In each friction engagement element, the pressure switch 19 is turned on when the fluid pressure reaches a pressure level to end a loss stroke and to start to produce an engagement capacity.

As a means for sensing an end of a loss stroke and a start of build up of an engagement capacity in a friction engagement element, it is possible to employ a stroke sensor for sensing a piston stroke in the friction engagement element, instead of an oil sensor. Alternatively, it is optional to sense an end of a loss stroke and a start of build up of an engagement capacity in a friction engagement element, by monitoring the command value of the fluid pressure for the friction engagement element or the solenoid drive duty corresponding to the command fluid pressure.

By performing a control program, the transmission controller 14 determines a desired speed for a current driving condition in accordance with the throttle opening (degree) TVO and the transmission output speed No (that is, the vehicle speed) from a predetermined control map. Then, the controller 14 examines whether the currently selected actual speed is identical to the desired speed. If it is not, the controller 14 produces a shift command, and effects a shift from the actual speed to the desired speed by varying the operating fluid pressures to change the engagement states of the friction elements according to the engagement logic of FIG. 2 by the duty control of the solenoids 10~13.

Figure 3:
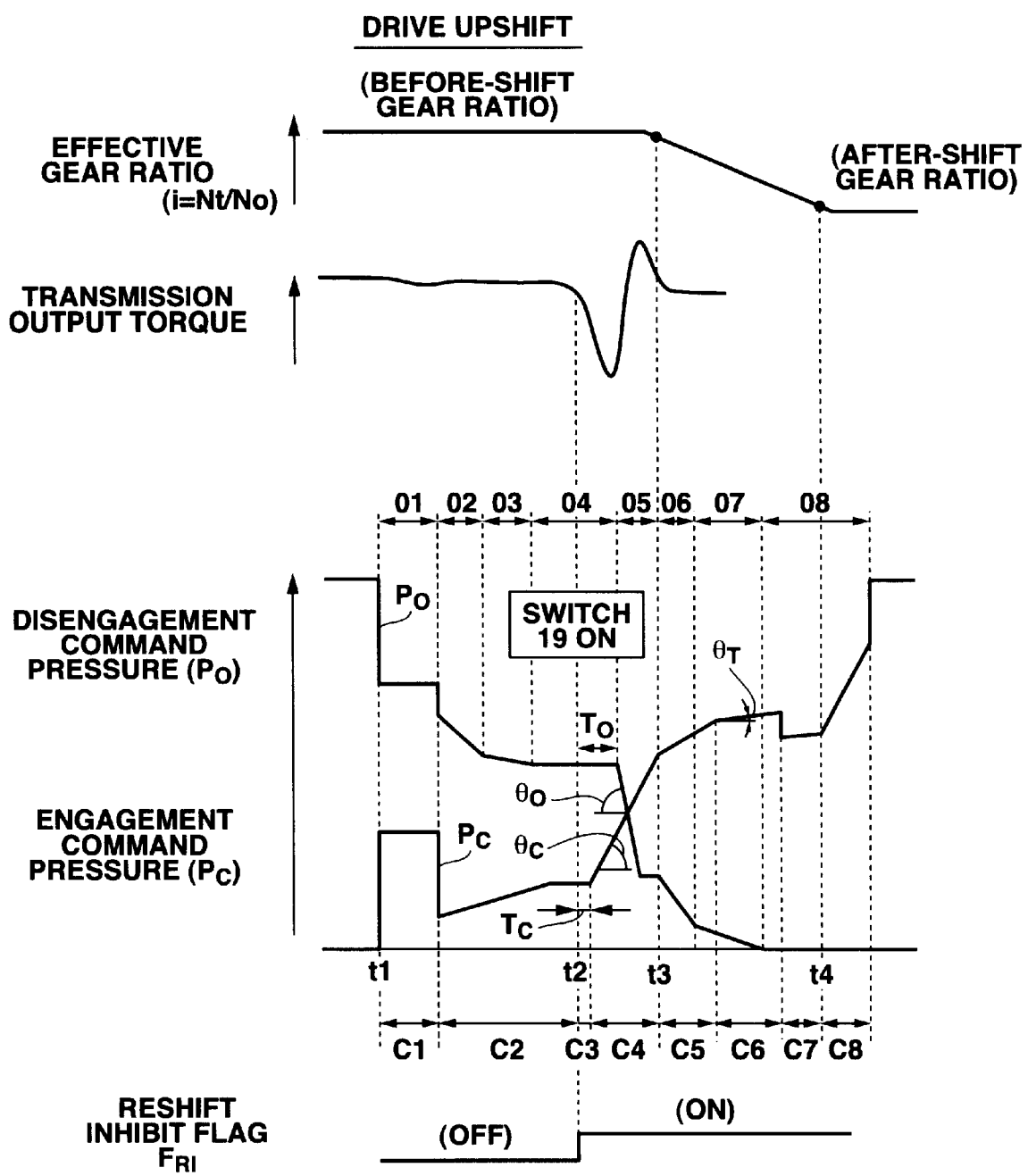
FIG. 3 is a time chart showing a reshift inhibit control operation in a drive upshift with friction elements changeover.

In a so-called interchange shift achieved by disengagement of a first friction element and engagement of a second friction element such as shifts between the second speed and the third speed and between the third speed and the fourth speed, this control system decreases a command operating fluid pressure Po for the first friction element (referred to as disengagement side friction element) to disengage the first friction element, and increases the operating fluid pressure Pc for the second friction element (engagement side friction element) to engage the second friction element as shown in FIG. 3 in the case of drive upshift due to a vehicle speed increase in a forward driving state, for example.

As shown in FIG. 3, the engagement side command fluid pressure Pc is first increased to a high precharge pressure in a first period C1 starting from the instant t1 of the occurrence of the shift command, like a rectangular pulse, to bring a loss stroke of the engagement side friction element to an end as soon as possible.

Then, in a second period C2, the engagement side command fluid pressure Pc is decreased from the precharge pressure to a lower pressure level to prevent a shock which would be caused at the end of the loss stroke if the precharge pressure were continued. Then, the engagement side fluid pressure Pc is increased gradually at a predetermined rate to prevent shock.

Therefore, the loss stroke ends and the engagement side friction element starts to have an engagement capacity at an instant t2. At this instant t2, the associated oil pressure switch 19 turns on. In the case of drive upshift, the output shaft torque first starts to change and a torque phase starts at the instant t2 as shown by waveform of the transmission output shaft torque due to a start of actual engagement of the engagement side friction element.

In a fourth period C4 starting from the end of a predetermined time interval Tc from the instant t2 at which the oil pressure switch 19 turns on, the engagement side fluid pressure Pc is increased at a predetermined rate θc greater than the rate in the second period C2 until the engagement capacity of the engagement side friction element is increased to the required capacity corresponding to the input torque. If, at this time, the disengagement side friction element is disengage, an interchange from the disengagement side friction element to the engagement side friction element is achieved, and the effective gear ratio i expressed as an input to output speed ratio Nt/No between the transmission input speed and the transmission output speed starts to vary from a before-change gear ratio toward an after-change gear ratio, so that an inertia phase starts.

In a fifth period C5 from the start of the inertia phase at t3, the engagement side fluid pressure Pc is further increased at a reduced rate until the fluid pressure reaches a predetermined initial shelf pressure adapted to the transmission input torque. In the following sixth period C6, the shelf pressure is set by increasing the fluid pressure Pc at a more gradual rate θT.

In a seventh period C7 up to an instant t4 at which the end of the inertia phase is detected, the engagement side fluid pressure Pc is once decreased to a value lower than the shelf pressure to prevent a shock at the end of the inertia phase, and then increased gradually. In an eighth period C8 from the instant t4, the engagement side fluid pressure Pc is increased steeply to the line pressure.

As shown in FIG. 3, the disengagement side command fluid pressure Po is first decreased, in a first period O1 from the instant t1 of the shift command, like a step change to a low pressure to ensure a satisfactory disengagement response of the disengagement side friction element. Thereafter, the disengagement side friction element is decreased at a gradual rate in a second period O2 following the first period O1, and at a more gradual rate in a third period O3 following the second period O2, until the fluid pressure Po reaches a pre-release pressure which a lowest pressure level capable of holding the disengagement side friction element in the engaged state without slippage.

In a fourth period O4 from the instant t2 at which the loss stroke ends in the engagement side friction element, the engagement capacity starts, and the associated oil pressure switch 19 turns on, to the end of a predetermined interval To, the disengagement side fluid pressure Po is held at the pre-release pressure. Then, the disengagement side command fluid pressure Po is decreased at a predetermined decrease rate θo and thereby the engagement capacity of the disengagement friction element is decreased gradually so as to achieve a changeover from the disengagement side friction element to the engagement side friction element in a next period O5 after the elapse of the predetermined time interval To.

After the instant t3 at which the start of the inertia phase is detected, the controller 14 further decreases the disengagement side command pressure Po at a rate smaller than θo of the period O5 in a period O6, and then at a rate smaller than the rate of period O6 in a next period O7. Finally, the disengagement side command pressure Po is reduced to the minimum setting of zero in a period O8, and held at the minimum setting until the inertia phase terminates.

The transmission controller 14 in this embodiment inhibits the reshift by switching a reshift inhibit flag FRI from OFF to ON at an earlier one of the pressure switch turn-on instant t2 at which the loss stroke ends and the engagement capacity of the engagement side friction element is increased from zero, and the inertia phase start instant t3 at which the effective gear ratio starts to vary from a before-change ratio to an after-change ratio.

In the case of drive upshift shown in FIG. 3, the torque phase starts first, and the pressure switch 19 turns on at the instant t2 in response to the end of the loss stroke in the engagement side friction element before the start of inertia phase at the instant t3. Therefore, the shift inhibit flag FRI is turned from OFF to ON at the pressure turn-on instant t2 to start the reshift inhibit period.

If a reshift command is produced before the pressure switch turn-on instant t2 during the process of the drive upshift, therefore this shift control system interrupts the shift, and instead starts the reshift to effect a jump shift as requested by the driver. If a reshift command is produced at or after the pressure switch turn-on instant t2 during the process of the drive upshift, the shift control system inhibits the reshift, continues the shift currently in progress, and allows the reshift after the end of the shift to protect the shift feeling from being impaired by the reshift at the middle of the progress of the shift. If the reshift is allowed after the instant t2, the reshift will be executed after the start of the torque phase of the shift operation, and torque phase shock will be produced twice, causing unpleasant shift feeling or slow shift. The inhibition of reshift after instant t2 is effective for preventing deterioration of the shift feeling.

Figure 4:
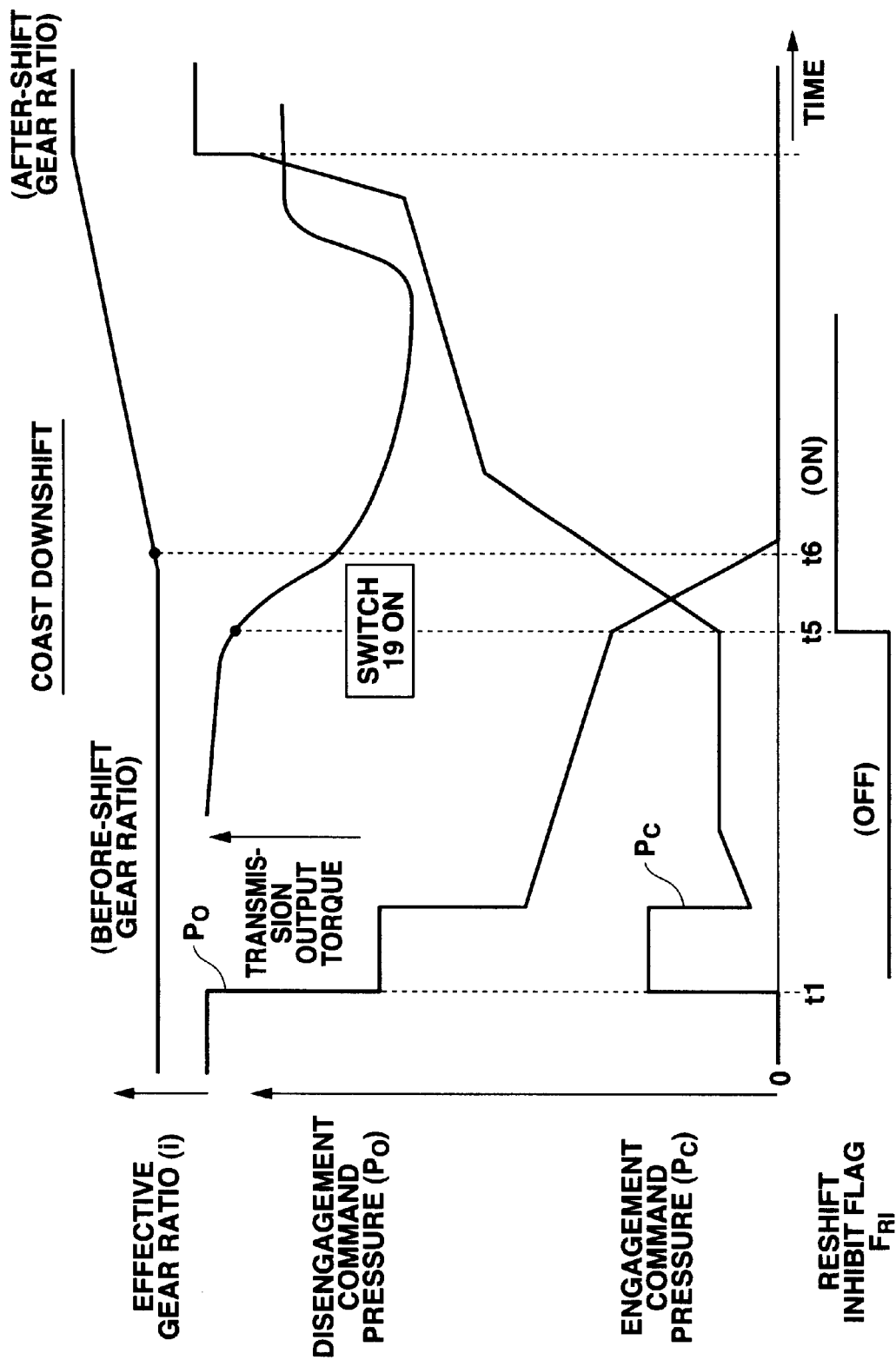
FIG. 4 is a time chart showing a reshift inhibit control operation in a coast downshift with friction elements changeover.

In coast downshift caused by a manual downshift operation during coasting drive, the control system controls the disengagement side command pressure Po and the engagement side command pressure Pc as shown in FIG. 4. In this case, too, the torque phase first starts at an instant t5 as shown by a characteristic curve of the transmission output torque when the loss stroke ends in the engagement side friction element, and the engagement capacity starts to build up. Thereafter, the inertia phase starts at an instant t6 as shown by a characteristic curve of the effective gear ratio, by disengagement of the disengagement side friction element. Therefore, the transmission controller 14 detects the start of the torque phase by turn-on of the associated pressure switch 19 at instant t5, and switches reshift inhibit flag FRI from OFF to ON to start the inhibit period at instant t5.

Figure 5:
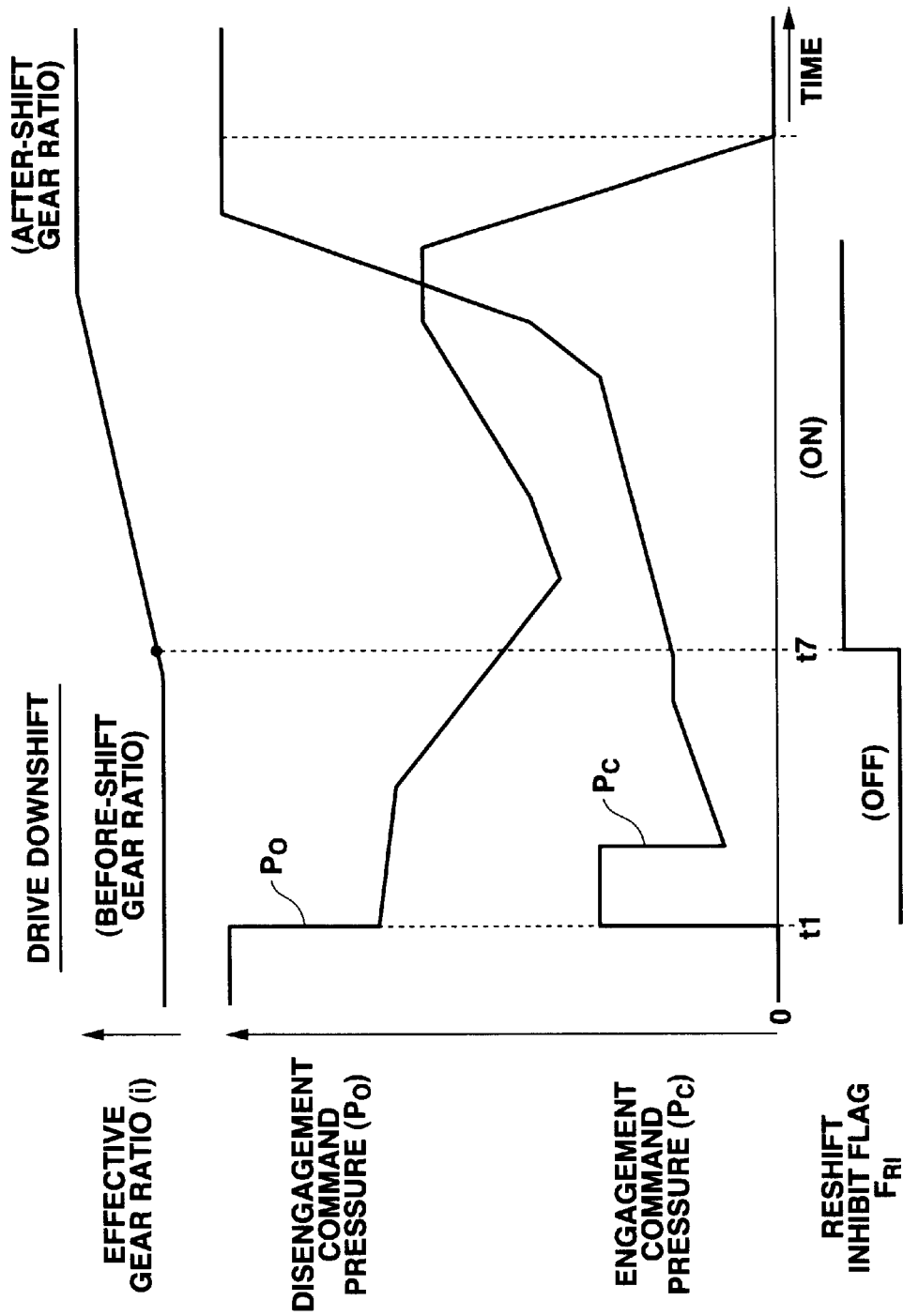
FIG. 5 is a time chart showing a reshift inhibit control operation in a drive downshift with friction elements changeover.
Figure 6:
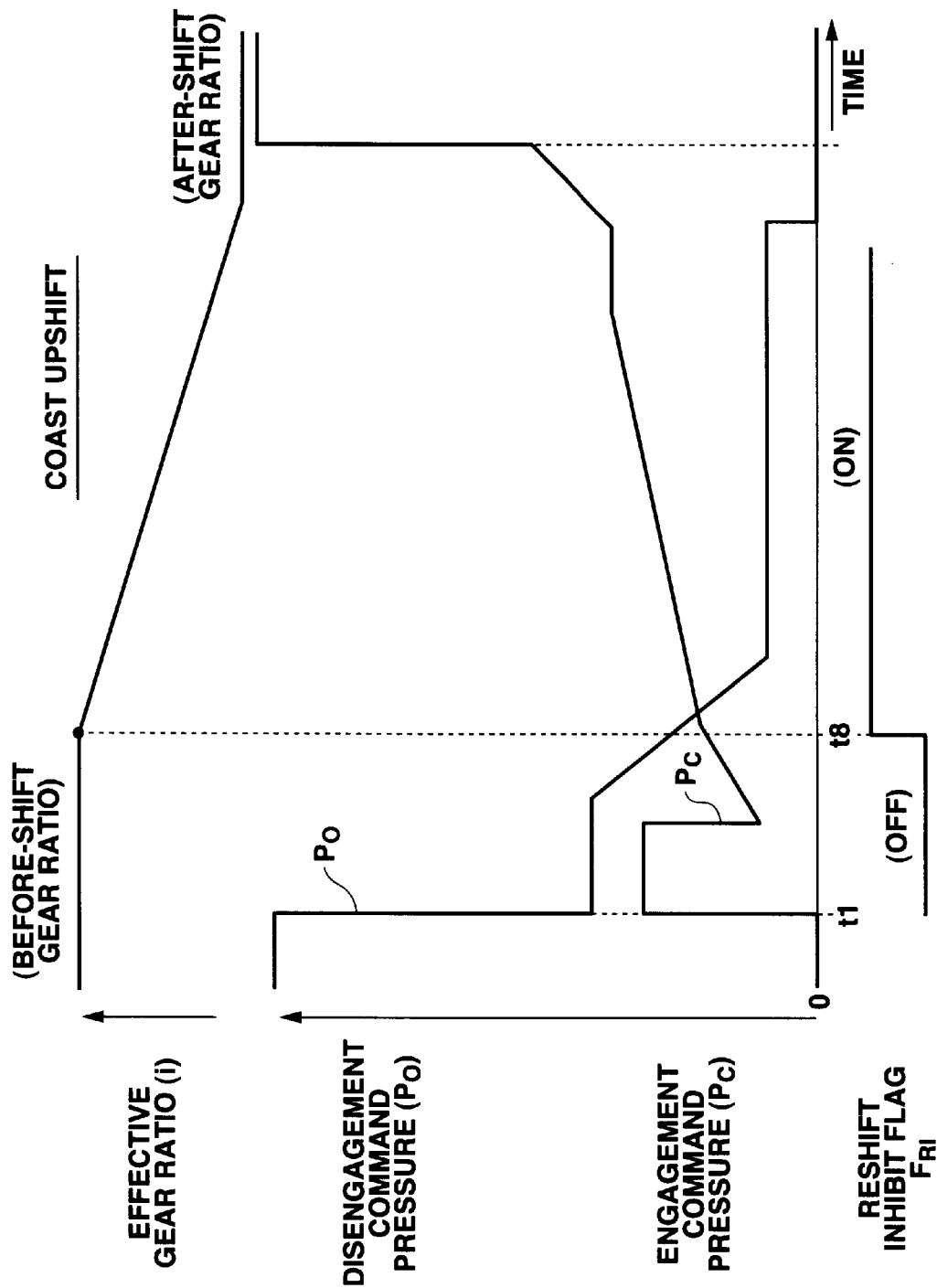
FIG. 6 is a time chart showing a reshift inhibit control operation in a coast upshift with friction elements changeover.

FIG. 5 shows control operations in drive downshift due to driver's depression of the accelerator pedal. FIG. 6 shows control operations in coast upshift due to release of the accelerator pedal. In either case, the inertia phase starts first at t7 in FIG. 5 or t8 in FIG. 6 as shown by a characteristic of the effective gear ratio when the capacity of the disengagement friction element decreases below the capacity corresponding to the input torque with decrease in the disengagement side command pressure Po from the instant of shift command, and the disengagement side friction element starts slipping. Then, the torque phase starts when the capacity of the engagement side friction element increases after the end of the inertia phase, with increase in the engagement side command pressure Pc from instant t1 and the capacity of the disengagement side friction element is further decreased. Therefore, controller 14 detects the start of the inertia phase at which the effective gear ratio i starts varying from a before-change ratio to an after-change ratio, and switches the reshift inhibit flag FRI from OFF to ON at instant t7 or t8 at which the start of the inertia phase is detected.

Thus, this control system starts the reshift inhibit period at earlier timing between the timing at which the capacity buildup is detected with pressure switch 19 in the engagement side friction element, and the timing at which the effective gear ratio starts to change and the inertia phase starts. In drive upshift (auto upshift) as shown in FIG. 3, and coast downshift as shown in FIG. 4, therefore, the reshift is inhibited when the pressure switch 19 detects the start of the torque phase. In the case of drive downshift (depression downshift) shown in FIG. 5 or coast upshift (release upshift) shown in FIG. 6, the reshift is inhibited upon detection of the start of the inertia phase. In either case, this control system can allow and inhibit the reshift timely. In a first stage of a shift operation before a start of a phenomenon, such as an inertia phase or a torque phase, which makes the driver aware of the shift operation, the shift control system of this embodiment can permit a reshift since the reshift is not problematical in this stage. In a second stage after a start of such a phenomenon, shift control system can inhibit a reshift. Thus, the shift control system can adequately permit and inhibit a reshift without requiring a changeover in a control logic even when shifts of different kinds are involved, without being influenced by irregularities in start timing of engagement of-friction engagement elements. Therefore, this control system can meet a request for reshift as much as possible by preventing premature reshift inhibition, and prevent undesired shift shock by inhibiting a reshift timely. The use of oil pressure switches 19 for detecting an end of a loss stroke and a start of increase in the engagement capacity is advantageous in the manufacturing cost.

Figure 7:
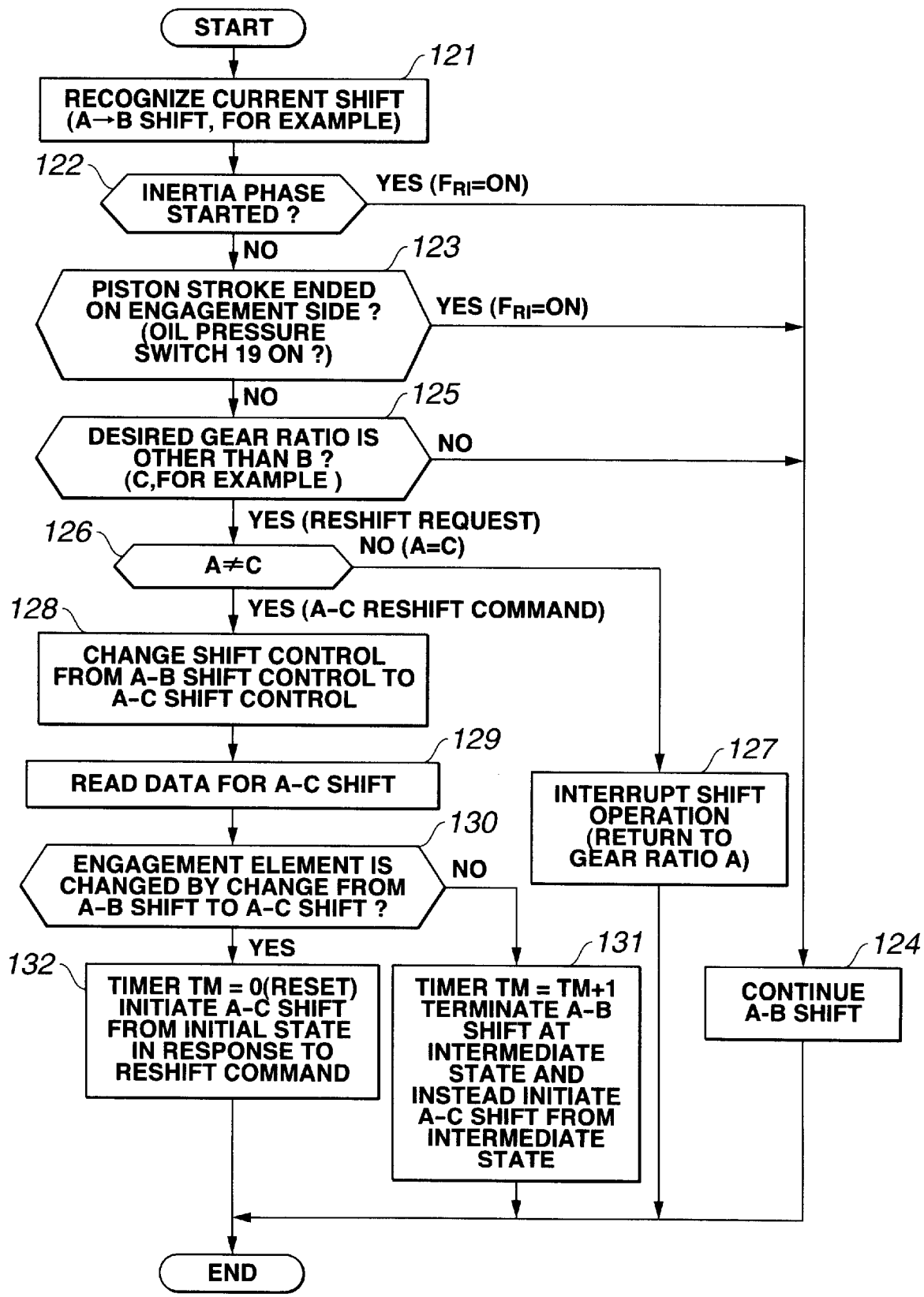
FIG. 7 is a flow chart showing a reshift control program according to the first embodiment.

FIG. 7 shows a reshift control program according to this embodiment of the present invention, which the transmission controller 14 performs before a turn-on of the reshift inhibit flag $F_{RI}$.

Step 121 is a step to recognize a current shift. In this example, a current shift is denoted as A→B shift. Step 122 checks if an inertia phase has started. Step 123 checks if a piston stroke has ended in the engagement side friction engagement element, by checking the on/off state of the corresponding oil pressure switch 19.

When the start of the inertia phase is detected or when the end of the piston stroke is detected (by turn-on of the oil pressure switch 19), that is when the reshift inhibit flag FRI is in the ON state to inhibit the reshift, the program proceeds to step 124 to continue the A–B shift until the completion of the A–B shift, without regard to a reshift command if any.

When the inertia phase is not yet started, and the piston stroke is not yet ended in the engagement side friction engagement element (the oil pressure switch 19 is off), that is when the answers of steps 122 and 123 are both negative, and the reshift inhibit flag FRI is in the off state still permitting a reshift, the program proceeds to next step 125 to carry out the reshift operation in response to a reshift command.

Step 125 determines a desired gear speed (C) adapted to the current driving situation in accordance with the throttle opening degree TVO and the transmission output speed No (the vehicle speed) by using a predetermined shift map, and examines if there is a reshift request by examining if the desired speed C is identical to the after-shift speed B of the A–B shift. If there is no reshift request, the A–B shift operation is continued at step 124. If there is a reshift request, a step 126 examines if the desired speed C is not identical to the before-shift speed A of the A–B shift.

If the desired speed C is identical to the speed A, the program proceeds to step 127 to interrupt the A–B shift operation directly and to return the speed to the before-shift speed A of the A–B shift.

If the desired speed C is different from the before-shift speed A, then the program proceeds from step 126 to step 128, and step 128 is executed to change over the transmission control from the A–B shift control to the A–C jump shift control according to a reshift command. At a next step 129, the controller 14 reads data required for the A–C jump shift from a memory.

At step 130, the controller 14 examines whether the engagement side friction element to be engaged in the A–C jump shift is different from the engagement side friction element to be engaged in the A–B shift.

When the engagement side friction element in the A–C jump shift is the same as the engagement side friction element in the A–B shift, and hence the engagement operation of the engagement side friction element in the A–B shift is to be continued in the A–C jump shift (reshift), then the controller 14 proceeds to step 131, continues the time count operation of the timer TM for measuring the elapsed time of the A–B shift without resetting, and thereby changes over the shift operation from an intermediate state in the A–B shift to an intermediate state for the A–C jump shift (reshift).

Figure 8:
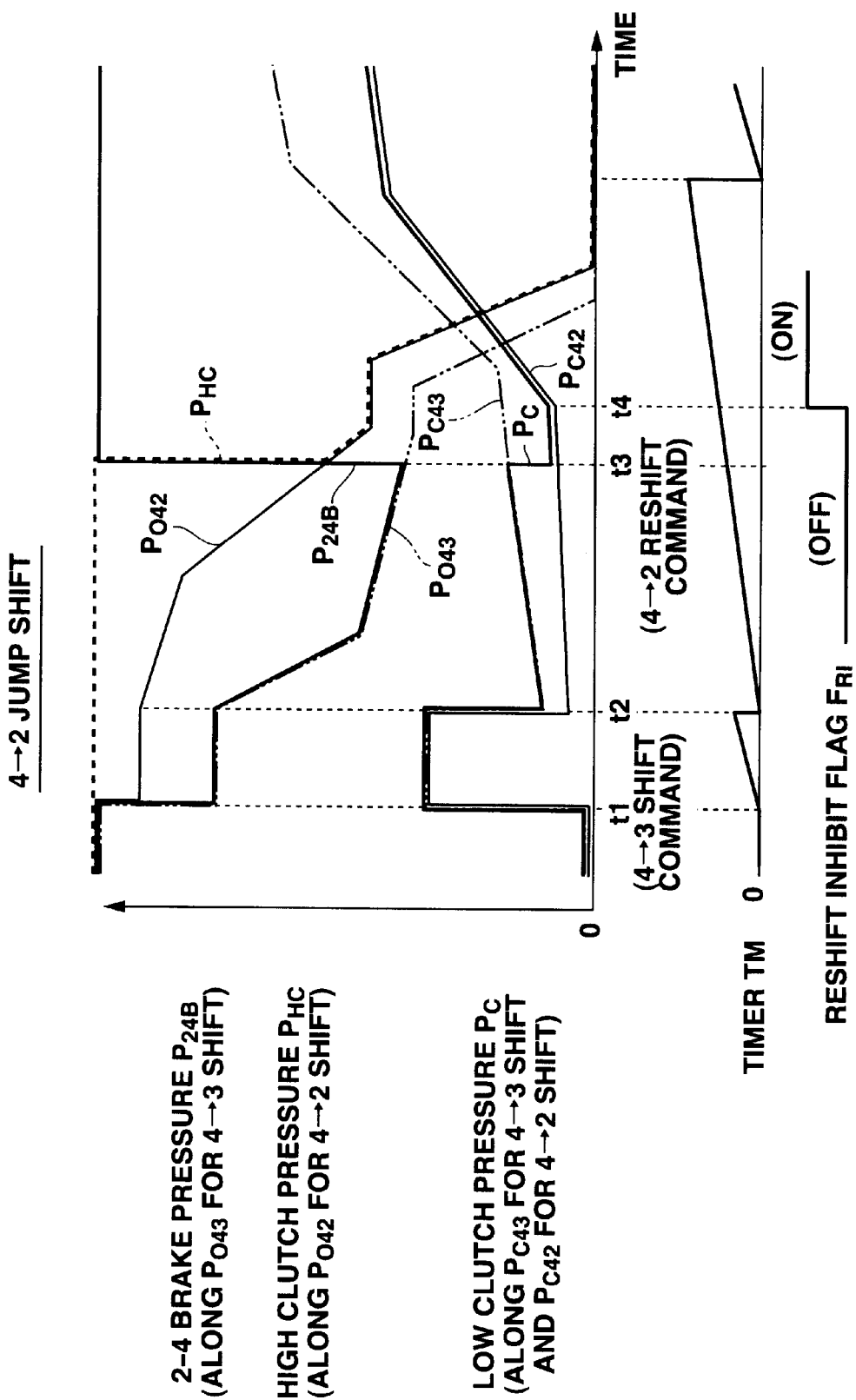
FIG. 8 is a time chart showing a reshift control operation in a first reshift control mode of step 131 in the program of FIG. 7.

FIG. 8 shows a reshift control operation in the reshift mode of step 131. In the example shown in FIG. 8, a 4–3 (A–B) shift command is produced at an instant t1, and a 4–2 (A–C) reshift command is produced at an instant t3 before the reshift is inhibited at an instant t4. As shown in FIG. 2, the low clutch L/C is the engagement side friction element for the 4–3 shift, and the 2–4 brake 2–4/B is the disengagement side friction element. For the 4–2 shift, the low clutch L/C is the engagement side element and the high clutch H/C is the disengagement side friction element. The low clutch L/C is to be engaged both in the 4–3 shift and 4–2 shift.

In this example, the operating fluid pressure (low clutch pressure) for low clutch L/C is increased along a characteristic command line Pc43 shown in FIG. 8 if the 4–3 shift is to be completed. If the 4–2 shift is started at instant t1 at which the 4–3 shift command is produced, and continued until the completion of the 4–2 shift, the low clutch pressure for low clutch L/C is increased along a characteristic command line Pc42. The low clutch pressure Pc43 for the 4–3 shift is set equal to a relatively high precharge pressure temporarily for a predetermined period from instant t1 to instant t2 (measured by a timer TM) to bring a loss stroke in the low clutch L/C to an end quickly. Thereafter, the low clutch pressure Pc43 is increased with time in a manner of time series. Similarly, the low clutch pressure Pc42 for the 4–2 shift is set equal to the high precharge pressure temporarily for the predetermined period from instant t1 to instant t2 to bring a loss stroke to an end quickly. Thereafter, the low clutch pressure Pc42 is increased with time in a manner of time series.

The 2–4 brake pressure for the 2–4 brake 2–4/B to be disengaged in the 4–3 shift is decreased along a characteristic command line Po43 shown in FIG. 8 if the 4–3 shift is to be completed. The high clutch pressure for the high clutch H/C to be disengaged in the 4–2 shift is decreased along a characteristic command line Po42 shown in FIG. 8 if the 4–2 shift is started at the 4–3 shift command instant t1 and continued until the completion. The 2–4 brake pressure Po43 for completing the 4–3 shift is decreased like a step change at t1 and held for the period from t1 to t2 to avoid a delay in disengagement of the 2–4 brake 2–4/B. Thereafter, the 2–4 brake pressure Po43 is decreased with time in a manner of time series. Similarly, the high clutch pressure Po42 for completing the 4–2 shift is decreased like a step change at t1 and held for the period from t1 to t2 to avoid a delay in disengagement of the high clutch H/C. Thereafter, the high clutch pressure Po42 is decreased with time in a manner of time series.

Therefore, the (re)shift control system can start the 4–3 shift operation at t1 and complete the 4–3 shift operation by increasing the low clutch pressure Pc43 to engage the low clutch L/C, and decreasing the 2–4 brake pressure Po43 to disengage the 2–4 brake 2–4/B. The shift control system can start the 4–2 shift operation at t1 and complete the 4–2 shift operation by increasing the low clutch pressure Pc42 to engage the low clutch L/C, and decreasing the high clutch pressure PHC to disengage the high clutch H/C.

During the period from the 4–3 shift command instant t1 to the reshift command instant t3, the low clutch pressure is increased along the characteristic line Pc43 for the 4–3 shift operation as shown by Pc in FIG. 8, and the 2–4 brake pressure P24B for the 2–4 brake 2–4/B is decreased along the characteristic line Po43 since there is no reshift command in this period.

On or after the 4–2 reshift command instant t3, the shift control system responds to the 4–2 reshift command by supplying the oil pressure equal to the low clutch pressure Pc42 for completing the 4–2 shift, to the low clutch L/C as shown by the line Pc in FIG. 8, and decreasing the fluid pressure PHC for the high clutch H/C to be disengaged in the 4–2 shift, along the high clutch pressure Po42 for completing the 4–2 shift. In the second speed after the 4–2 shift, the 2–4 brake 2–4/B is held engaged, so that the fluid pressure P24B for the 2–4 brake is held at a maximum setting of line pressure on or after the 4–2 reshift command instant t3.

This reshift control system interrupts the shift operation to 3rd speed at resift command instant t3, and starts the 4–2 shift operation as commanded by the reshift command. On or after the reshift command instant t3, the pressure Pc for the engagement side friction element (low clutch L/C) is increased along the characteristic line PC42 whose start point is set at the 4–3 shift command instant t1. On or after the reshift command instant t3, the fluid pressure for the high clutch H/C to be disengaged in the 4–2 reshift is decreased along the characteristic line Po42 whose start point is set at the 4–3 shift command instant t1. Therefore, this shift control system can provide a reshift control performance adapted to the timing of the reshift command instant t3, and achieve both of the reduction of shift shock and the improvement in shift response in a manner as if the 4–2 jump shift were initiated at the command instant t1 of the 4–3 shift. This shift control system can produce these effects without the need for new setting of control mode or addition of new data map, so that this control system is advantageous in manufacturing cost.

In this reshift control mode of step 131, the shift control system starts the 4–2 jump shift from an intermediate state determined by an elapsed time from the 4–3 shift command instant t1 to the reshift command instant t3 according to the characteristic line Pc42 shown in FIG. 8 as if the 4–2 jump shift were initiated at the 4–3 shift command instant t1.

Therefore, this reshift control mode of step 131 can reduce the time from the reshift command to the end of the reshift operation. Though the driver may feel that the reshift is performed for a period from t1 to the end of the reshift command, this shift control system can avoid slow shift feeling, and feeling of insufficient acceleration and insufficient engine braking.

In FIG. 8, there is a significant difference between the low clutch pressure PC43 for the 4–3 shift up to the 4–2 reshift command instant t3, and the low clutch pressure PC42 for the 4–2 shift. However, this difference is exaggerated in FIG. 8 for facilitating understanding. These two pressures are both for causing a loss stroke in the same low clutch L/C, so that the difference is not so increased in reality. Moreover, the low clutch pressure is still in the level to causing the piston stroke, and hence the capacity of the low clutch L/C is still null (the reshift would be inhibited with the turn-on of the oil pressure switch 19 if the capacity were increased from zero.). Therefore, the above-mentioned change in the low clutch pressure L/C from the level of the PC43 to the level of PC42 is not causative of shift shock.

The disengagement side elements are changed abruptly and the fluid pressures on the disengagement side are changed like a step change. However, in this stage where a reshift is permitted, the disengagement side friction element does not participate in variation in the output shaft torque and variation in the input revolution speed due to shift (the participation of the disengagement side friction element in the torque phase does not start in this stage, and the slippage in the disengagement side friction element does not start yet in the stage before a start of the inertia phase). Therefore, this does not cause a shift shock.

When the (second) engagement side friction element to be engaged for the A–C jump shift is not the same as the (first) engagement side friction element to be engaged for the A–B shift, then the controller 14 proceeds from step 130 to step 132 to disengage the first engagement side element and instead engage the second engagement side friction element in a second reshift control mode. At step 132, controller 14 resets the timer TM in operation to measure the elapsed time in the A–B shift, to zero at the time t3 of the reshift command, and thereby counts the elapsed time from the A–C reshift command instant t3 with the timer TM. By using the measured time by the timer TM from instant t3, the shift control system initiates the A–C jump shift (reshift) operation from scratch without regard to the progress of the A–B shift.

Figure 9:
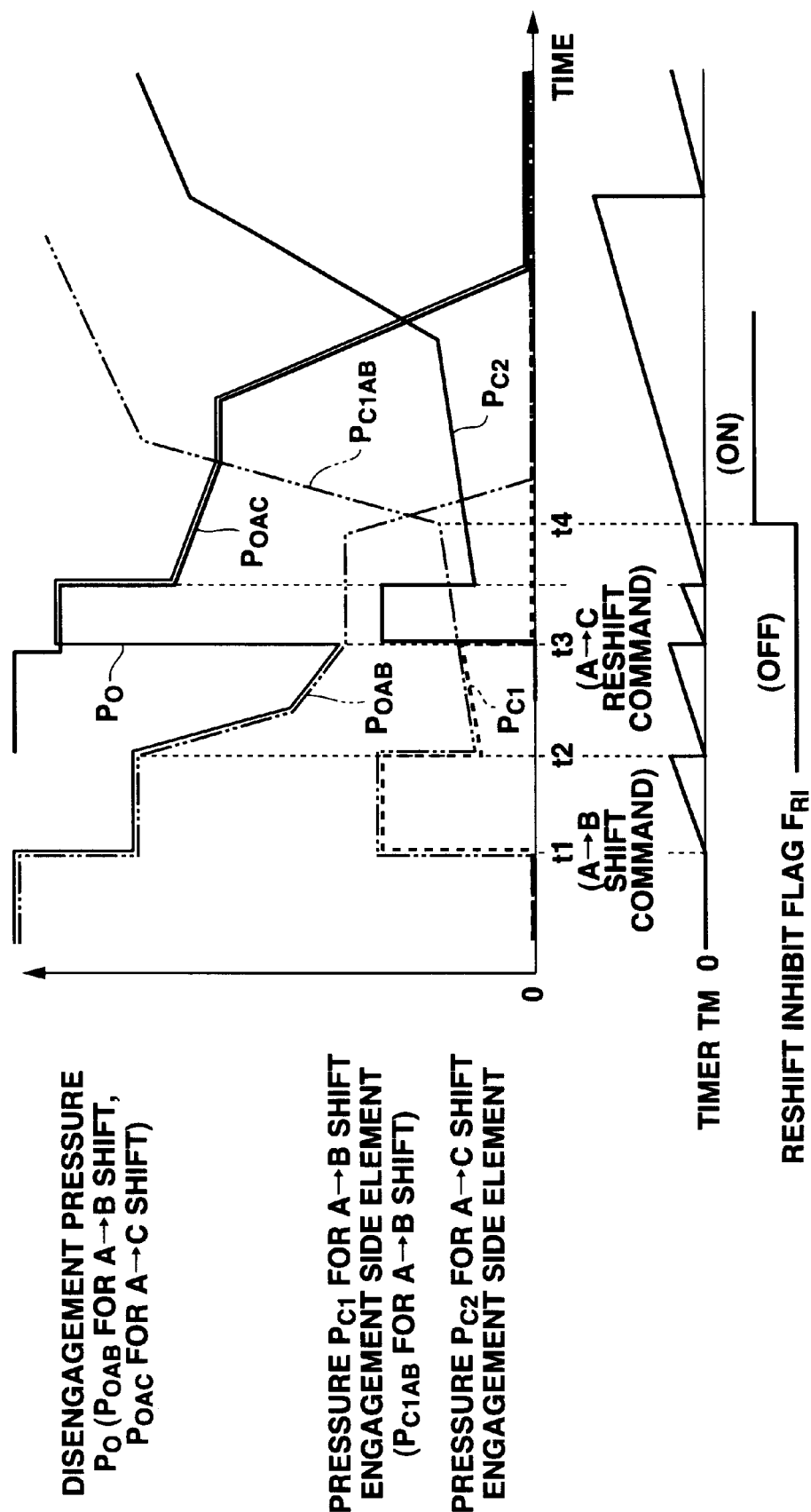
FIG. 9 is a time chart showing a reshift control operation in a second reshift control mode of step 132 in the program of FIG. 7.

FIG. 9 shows a reshift control operation in step 132. In this example, the A–B shift command is produced at instant t1, and the timer TM is reset to zero in response to the A–C reshift command produced at instant t3 prior to the reshift inhibit instant t4.

The fluid pressure for the first engagement side friction element to be engaged in the A–B shift is controlled along a characteristic line PC1AB when the A–B shift is continued until completion. The fluid pressure for the disengagement side friction element to be disengaged in the A–B shift is controlled along a characteristic line PoAB in FIG. 9 if the A–B shift is continued until completion. The shift control system can start the A–B shift operation at an instant t1 in FIG. 9 and complete the A–B shift by increasing the engagement side fluid pressure PC1AB to engage the first engagement friction element and decreasing the disengagement side fluid pressure PoAB to disengage the disengagement side friction element.

During the period from the A–B shift command instant t1 to the reshift command instant t3 in FIG. 9, the fluid pressure PC1 for the first engagement side to be engaged for the A–B shift is increased along the characteristic line PC1AB for the A–B shift. The fluid pressure Po for the disengagement side friction element to be disengaged in the A–B shift is decreased along the characteristic line PoAB for the A–B shift.

On or after the A–C reshift command instant t3, the shift control system responds to the A–C reshift command by increasing the fluid pressure PC2 for the second engagement element to be engaged in the A–C shift in a predetermined pattern in accordance with the elapsed time measured by the timer TM from the reshift command instant t3. Instead, the shift control system reduces the fluid pressure PC1 for the first engagement element engaged halfway, to minimum setting, and thereby disengages the first engagement side element.

When the disengagement side element to be disengaged in the A–C shift is the same as the disengagement side element to be disengaged in the A–B shift, then the shift control system can complete the A–C shift by decreasing the fluid pressure for that element along the characteristic line PoAC from instant t3. Therefore, the disengagement side fluid pressure Po is decreased along the line PoAC from instant t3 in accordance with the elapsed time measured by the timer TM in a manner of time series.

When the disengagement side element to be disengaged in the A–C shift is not the same as the disengagement side element to be disengaged in the A–B shift, the shift control system can achieve the A–C reshift by decreasing the disengagement side fluid pressure from the reshift command instant t3 along the line PoAC.

Figure 10:
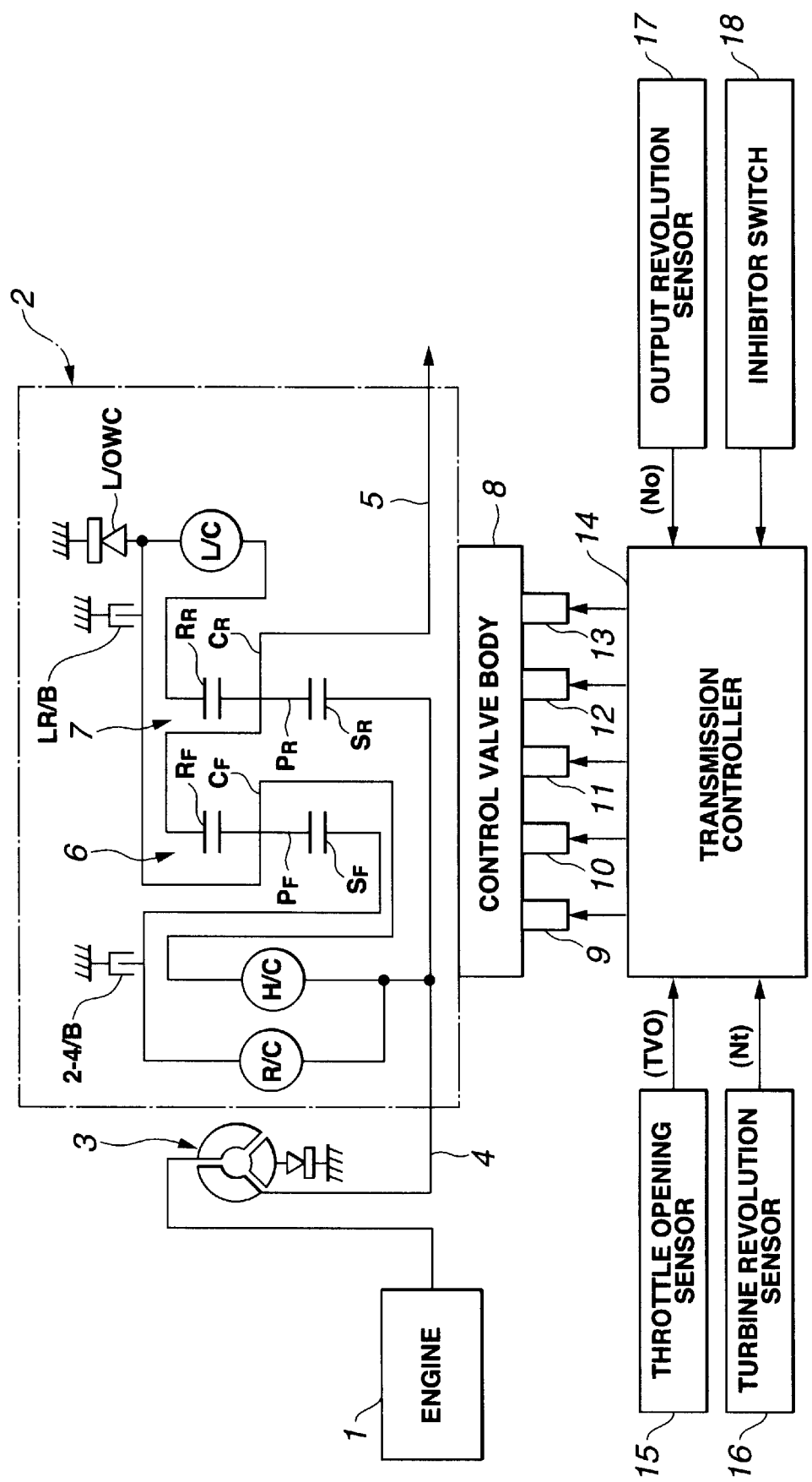
FIG. 10 is a schematic view showing a reshift control system according to a second embodiment of the present invention.

In the second reshift control mode, the shift control system can achieve the reshift inadequate to the first reshift control mode of step 131, by performing the engagement operation of the engagement side element for the A–C shift and the disengagement operation of the disengagement side element for the A–C shift from the respective initial states, so that FIG. 10 shows a shift (or reshift) control system according to a second embodiment of the present invention. The system shown in FIG. 10 is almost identical in construction and operation, to the system of FIG. 1. The system of FIG. 10 provides various speeds in the same manner as shown in FIG. 2 of the first embodiment.

In D range, transmission controller 14 shown in FIG. 10 determines a desired gear speed GPN (shown in FIGS. 11~13) desired for the current driving conditions in accordance with throttle opening (degree) TVO and transmission output speed No (vehicle speed) according to a predetermined shift map by performing a control program.

Then, controller 14 determines whether to permit a shift request to the desired speed GPN. In the case of permission, controller 14 changes a command speed GPs (shown in FIGS. 11~13) to the most recent desired speed GPN as requested. The transmission controller 14 further examines whether a current speed GPc (shown in FIGS. 11~13) currently being selected is identical to the command speed GPs. When they are not the same, the controller 14 produces a shift command for a shift to the command speed GPs (desired speed GPN) to initiate a corresponding shift operation according to the logic table as shown in FIG. 2 by duty control of solenoids 10~13 as in the first embodiment.

Figure 11:
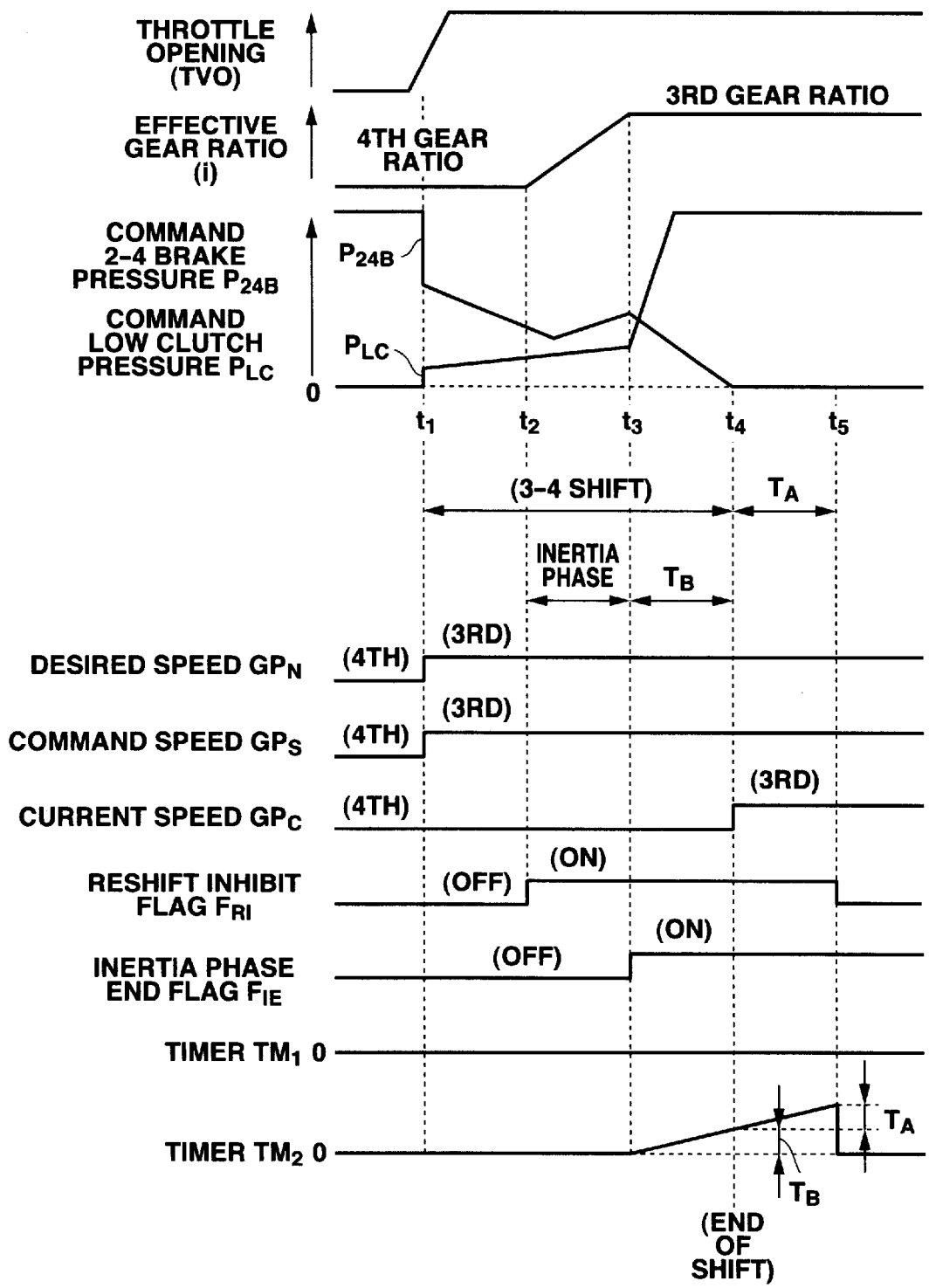
FIG. 11 is a time chart showing a normal 4–3 shift control operation performed by the reshift control system of FIG. 10.

FIG. 11 shows, as an example, 4–3 downshift operation. In this example, the desired speed GPN is changed from 4th speed to 3rd speed at an instant t1 in response to a change in the throttle opening TVO as shown in FIG. 11. Thereafter, the desired speed GPN is held at 3rd speed without a reshift request.

The change in the desired speed GPN at t1 is not a reshift request during a shift operation. Therefore, the command speed GPs is changed immediately from 4th speed to 3rd speed, and hence the 4–3 downshift operation is initiated at instant t1 in response to a discrepancy between the command speed GPs and current speed GPc (4th speed).

This 4–3 downshift requires disengagement of 2–4 brake 2–4/B and engagement of low clutch L/C as shown in FIG. 2. Therefore, the shift control system decreases the 2–4 brake pressure P24B for 2–4 brake 2–4/B and increases the low clutch pressure PLC for low clutch L/C as shown in FIG. 11, in this example. As the disengagement of 2–4 brake 2–4/B and the engagement of low clutch L/C proceed, the effective gear ratio i (Nt/No) is varied from a before-shift gear ratio (4th speed gear ratio) to an after-shift gear ratio (3rd speed gear ratio) during a period from t2 to t3 as shown in FIG. 11. This period in the shift operation is an inertia phase. In this example, the shift control system sets a reshift inhibit flag FRI to ON to start reshift inhibition at an instant t2 at which the inertia phase starts, that is the effective gear ratio i starts to vary toward the after-shift ratio. At the inertia phase end instant t3 at which the effective gear ratio reaches the after-shift gear ratio (or enters a predetermined region including the after-shift ratio), the transmission controller 24 sets an inertia phase end flag FIE to ON.

Timer TM2 measures an elapsed time from the inertia phase end instant t3. At an instant t4 at which the measured time of timer TM2 reaches a predetermined after-inertia-phase process time TB, the shift control system of this example judges that the shift is ended and sets the current speed GPc equal to 3rd speed.

Timer TM2 further measures the elapsed time from the shift end instant t4. At an end t5 of a predetermined time TA from the shift end instant t4, the shift control system resets the reshift inhibit flag FRI to OFF to cancel the reshift inhibition, and to permit a reshift operation.

Figure 14:
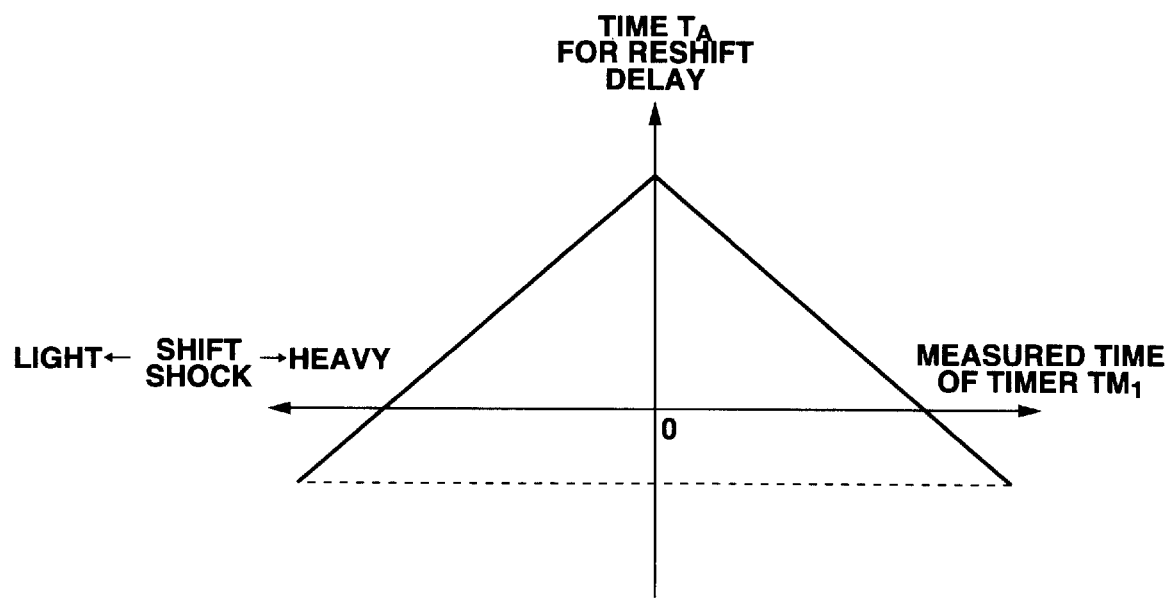
FIG. 14 is a diagram showing a characteristic of a reshift delay time (length) TA used in the second embodiment.

The time TA is a variable varied in dependence on a measured time of timer TM1 as shown in FIG. 14. A value of maximum setting of the time TA(a value of TA obtained when the measured time of timer TM1 is close to zero as shown in FIG. 14) is set equal to an amount of time required to attain a settled state capable of controlling fluid pressures for a next shift after a pressure regulating system of the shift control system is held stable enough to hold the state of the after-shift gear ratio.

Figure 12:
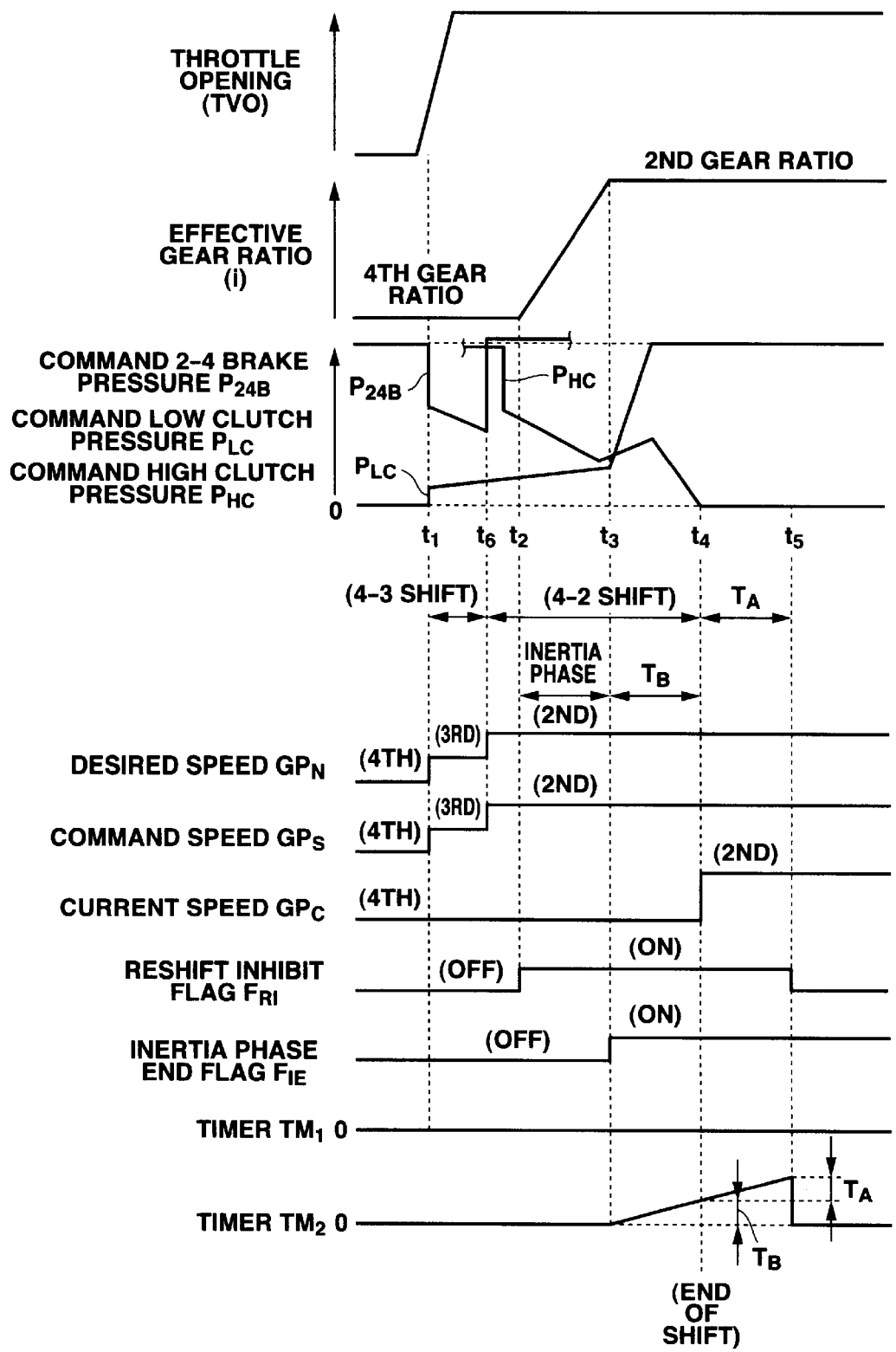
FIG. 12 is a time chart showing a 4–2 jump reshift control operation performed by the reshift control system of FIG. 10 in response to a reshift request produced in an early stage of a 4–3 shift operation.

FIG. 12 shows, as an example, a 4–2 reshift operation. In this example, the desired speed GPN is changed from 4th speed to 3rd speed at an instant t1 in response to a change in the throttle opening TVO as shown in FIG. 11. Then, during the shift operation initiated by this change, the desired speed GPN is further changed from 3rd speed to 2nd speed at an instant t6 and a reshift request is produced accordingly.

In response to the change of the desired speed GPN at instant t1, the command speed GPs is changed immediately from 4th speed to 3rd speed, and a 4–3 downshift operation is started at instant t1 in the same manner as in the example of FIG. 11. In the example of FIG. 12, the reshift request is produced in response to the change in the desired speed at instant t6 before a start of an inertia phase, that is, before a turn-on of the reshift inhibit flag FRI. Therefore, the reshift operation is permitted, without waiting until an end of the 4–3 downshift operation, in the following manner.

The shift control system changes the command speed GPs from 3rd speed to 2nd speed immediately at the reshift request instant t6, and starts the 4–2 jump downshift operation instead of the 4–3 downshift, in response to a discrepancy between the command speed GPs and the current speed GPc (4th). The shift control system performs the 4–2 shift operation by increasing the low clutch pressure PLC continuously to continue the engagement operation of the low clutch L/C, by increasing the 2–4 brake pressure again to return the 2–4 brake 2–4/B to the engaged state, and by decreasing the high clutch pressure PHC to bring the high clutch H/C from the engaged state to the disengaged state. By the 4–2 jump shift operation, the effective gear ratio i is varied during a period from instant t2 to instant t3, from the before-shift ratio (4th speed gear ratio) to the after-shift ratio (2nd speed gear ratio). The inertia phase inhibit flag FRI is set ON at instant t2 when the inertia phase is started, and the inertia phase end flag FIE is set ON at instant t3 when the inertia phase is ended.

Timer TM2 measures the elapsed time from the end t3 of the inertia phase, and the current speed GPc is changed to 2nd speed at the end t4 of the shift operation when the measured time of timer TM2 reaches the after-inertia-phase process time TB. At the end t5 of the time length TA from instant t4, the shift control system resets the reshift inhibit flag to OFF and thereby terminates the reshift inhibit period, to permit a reshift on or after instant t5.

Figure 13:
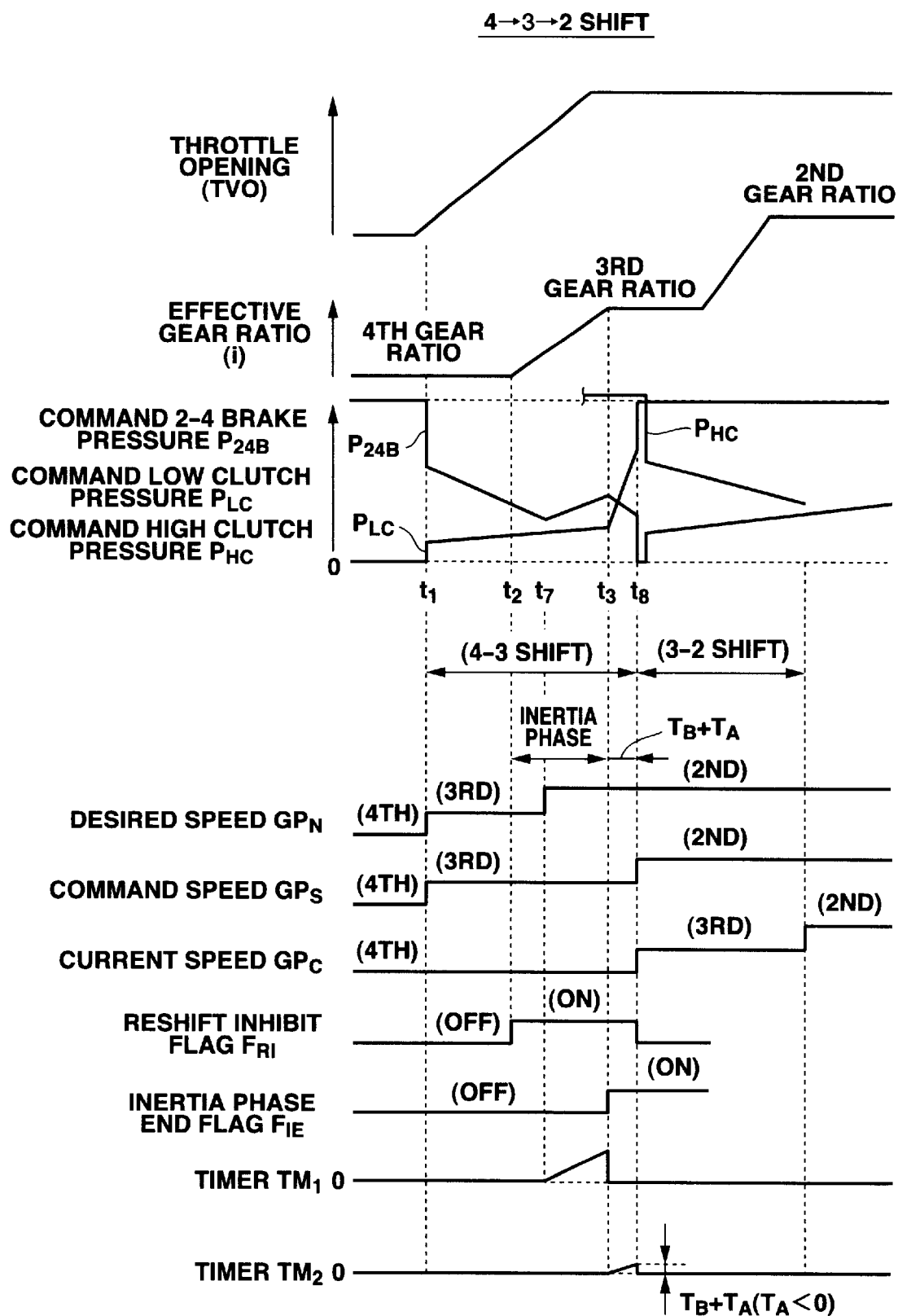
FIG. 13 is a time chart showing a 4–3–2 downshift control operation performed by the reshift control system of FIG. 10 as the result of a delayed reshift operation.

FIG. 13 shows a delayed reshift operation. In this example, the desired speed GPN is changed from 4th speed to 3rd speed at an instant t1. At an instant t7 during the shift operation responsive to this changed in the desired speed GPN, the desired speed GPN is further changed from 3rd speed to 2nd speed and a reshift request is produced.

The 4–3 downshift operation is started immediately at instant t1 in the same manner as in the preceding example of FIG. 11. The inertia phase starts at instant t2, and ends at instant t3. The inertia phase inhibit flag FRI is set to ON at instant t2 when the inertia phase starts. The inertia phase end flag FIE is set to ON at instant t3 when the inertia phase ends.

At instant t7 after the inertia phase is started at t2 and the reshift inhibit flag FRI is set to inhibit a reshift, a reshift request is produced by a change in the desired speed GPN from 3rd speed to 2nd speed. Therefore, this shift control system inhibits (or delays) the reshift operation and initiates the reshift operation after the end of the original shift operation. The control system holds the command speed GPs at 3rd speed without rewriting the command speed to 2nd speed at the reshift request instant t7, and thereby continues the 4–3 downshift operation responsive to the discrepancy between the command speed (3rd speed) and the current speed GPc (4th speed).

When a reshift request is produced after the setting of the reshift inhibit flag FRI (after the start of the inertia phase, that is), the timer TM1 measures a time from the reshift request instant t7 to the end t3 of the inertia phase, and determines the time TA for reshift delay in accordance with the measured time of timer TM1. The earlier the reshift request timing is, the longer the measured time of timer TM1 is. The time TA is decreased as the measured time from the instant t7 of the reshift request to the instant t3 of the end of the inertia phase is becomes longer. That is, the time TA is make shorter as the timing of a reshift request is earlier. In this example, the time TA is made negative when the timing of the reshift request instant t7 is extremely earlier or when the reshift request is produced immediately after the start of the inertia phase.

The length of the reshift delay time TA is related to the magnitude of a shift shock, as shown in FIG. 14. By increasing the reshift delay time, it is possible to reduce a shift shock though a reshift response delay is increased. When, on the other hand, the reshift delay time is shorter, the shift shock tends to increase though the reshift response delay is not increased so much. Therefore, the map shown in FIG. 14 to determine the reshift delay time TA in accordance with the measured time of the timer TM1 (or the timing of reshift request) is determined in accordance with a driver's demand for a reshift response delay, and reduction in shift shock at each level of the reshift request timing.

In the case of FIG. 13, as in the examples of FIG. 11 and FIG. 12, the shift control system resets the reshift inhibit flag FRI to OFF and thereby cancels the reshift inhibition at an instant t8 when the sum of the after-inertia phase process time TB and the reshift delay time TA has elapsed from the end t3 of the inertia phase. At the same time, the shift control system sets the current speed GPc to 3rd speed in response to the end of the shift operation.

In response to the operation to cancel the reshift inhibition at instant t8 (FRI=OFF), the command speed GPs is changed from 3rd speed to 2nd speed as requested by the desired speed GPN, and the shift control system performs a reshift operation (3–2 downshift) in response to a discrepancy between the command speed GPs (2nd speed) and the current speed GPc (3rd speed).

The reshift (3–2 downshift) operation is performed by increasing the 2–4 brake pressure P24B again to engage the 2–4 brake 2–4/B again while holding the low clutch L/C in the engaged state by holding the low clutch pressure PLC, and decreasing the high clutch pressure PHC to disengage high clutch H/C. In the process of the reshift (3–2 downshift), the effective gear ratio i varies from the 3rd speed ratio to 2nd speed ratio and the current speed GPc is switched to 2nd speed when a time of the after-inertia-phase process time TB has elapsed from the inertia phase end instant.

When another (3–2) shift request (reshift request) is produced after the start t2 of the inertia phase, the shift control system inhibits the 3–2 reshift operation until the instant t8, and starts the 3–2 reshift operation at the instant t8 retarded from the inertia phase end instant t3 by the sum of the after-inertia-phase process time TB and the reshift delay time TA. This retardation causes a reshift response delay. However, the shift control system can prevent a shift shock which would be caused if a reshift operation were started during an original shift operation. This shift control system can further prevent shift shock due to the instability in the pressure regulating system immediately after the end of the inertia phase.

In the second embodiment, as shown in FIG. 14, the reshift delay time TA is decreased as the time length (measured by timer TM1) from instant t7 of the reshift request, to the end t3 of the inertia phase becomes longer. Thus, this shift control system adjusts the reshift delay time TA in accordance with the timing of the reshift request, and makes the reshift delay time TA shorter as the timing of a reshift request is earlier.

Thus, a reshift operation is started earlier if a reshift request is produced earlier, so as to meet a driver's expectation for earlier reshift operation. If a reshift request is produced in a relatively late stage of the shift operation, the reshift operation is started at a later timing so as to meet the driver's demand for less shock rather than earlier reshift operation.

In this embodiment, the shift control system starts the reshift operation immediately if a reshift request is produced before a start of an inertia phase. Therefore, it is possible to set the starting timing of the reshift delay time adequately so as to avoid useless delay and prevent deterioration in the drive feeling due to delay in reshift control.

The reshift delay time TA is made negative when the time (the measured time of timer TM1) from instant t7 of the reshift request to the end t3 of the inertia phase is in a predetermined long region as shown in FIG. 14. In this case, the reshift operation is permitted at instant t8 (shown in FIG. 13) before the end t4 (shown in FIG. 11 or 12) of the shift operation after the end t3 of the inertia phase. Thus, if a reshift request is produced at instant t7 immediately or shortly after the start of the inertia phase, the shift control system can start the reshift operation in an unsettled period after the end of the inertia phase in which the pressure regulating system is still unstable and there is a possibility of shift shock, without waiting for an end of the shift operation (at t4 in FIG. 11 or 12), so that the system can respond to the driver's demand quickly.

With the after-inertia-phase process time TB, it is possible to defer the timing to declare the end of the shift operation adequately until, for example, the engagement side command fluid pressure becomes equal to a maximum value indicating the completion of the engagement, and the disengagement side command fluid pressure becomes equal to a minimum value indicating the completion of the disengagement after the end of the inertia phase. Therefore, this shift control system can delay the reshift operation reliably until the stable state is reached, and thereby permit the reshift operation at timing to reduce the tendency to shift shock.

Figure 15:
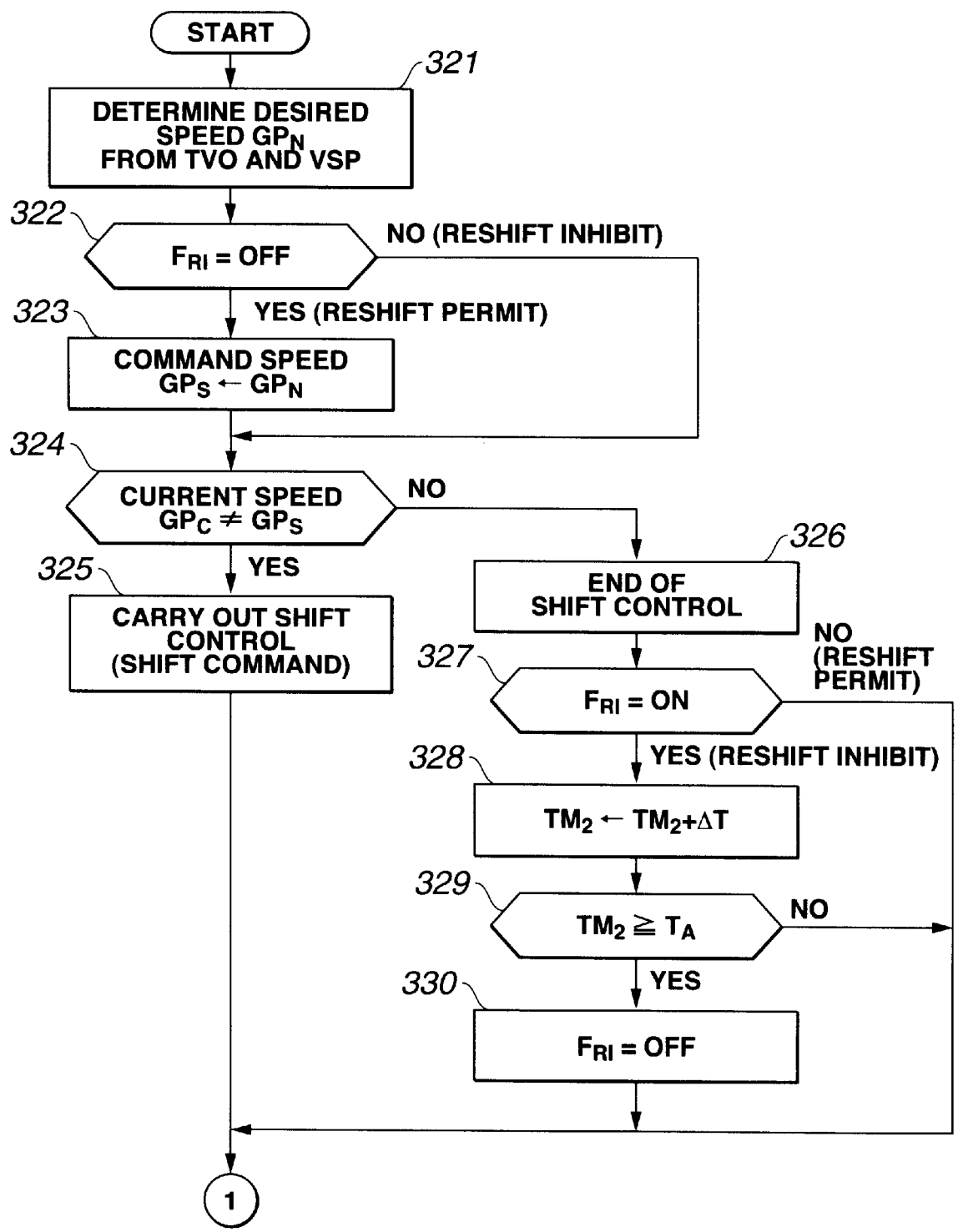
FIG. 15 is a flow chart showing a first half of a reshift control program performed by the control system of FIG. 10 to achieve the reshift control operations shown in FIGS. 11~13.
Figure 16:
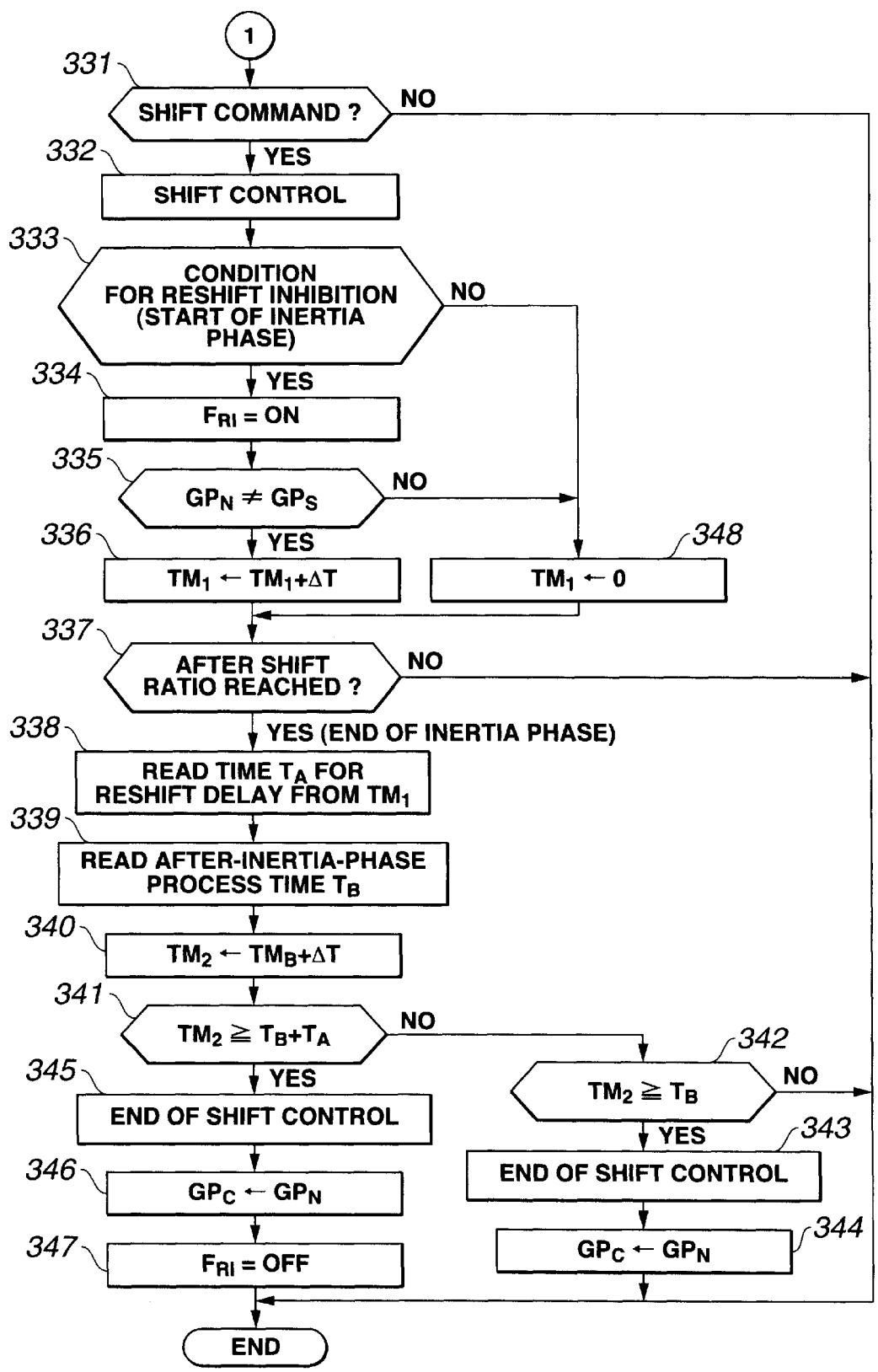
FIG. 16 is a flow chart showing a second half of the reshift control program performed by the control system of FIG. 10 to achieve the reshift control operations shown in FIGS. 11~13.

The reshift control is performed according to a program shown in FIGS. 15 and 16 executed at regular time intervals of a predetermined time length ΔT.

Step 321 is a step to determine the desired speed suitable to the current driving situation in accordance with throttle opening TVO and vehicle speed VSP by using a predetermined shift map.

Step 322 examines whether the reshift inhibit flag FRI is OFF (the state permitting a reshift operation) or not. In the reshift permitting (OFF) state, step 323 sets the command speed GPs to the desired speed GPN. In the case of the reshift inhibit state (ON), step 323 is skipped to hold the command speed GPs unchanged.

Step 324 compares the thus-determined command speed GPs with the current speed GPc. If they are not the same, step 325 produces a shift command from the current speed GPc to the command speed GPs and thereby carries out the shift operation. When the command speed GPs is the same as the current speed GPc, then step 326 makes a judgment of the end of the shift control (that the instant t4 in FIG. 11 or 12 is reached), and step 327 examines whether the reshift inhibit flag FRI is ON. When the reshift inhibit flag FRI is ON (in the reshift inhibiting state), step 328 measures the elapsed time from instant t4 by increment the timer TM2. Step 329 examines whether the elapsed time measured by timer TM2 is equal to or greater than the reshift delay time TA. When the elapsed time has reached the reshift delay time TA (the instant t5 is reached), step 330 resets the reshift inhibit flag FRI to OFF to permit the reshift. After the reshift inhibit flag FRI is reset to OFF, steps 28~30 are skipped, and the program proceeds from step 327 to step 331.

Step 331 of FIG. 16 is reached after step 325, 330, 327 or 32 (in the case of NO). Step 331 checks whether there exists a shift command of step 325. When there is no shift command, the program terminates the control execution.

When there is a shift command, step 332 performs the shift control in a normal mode, and step 333 examines whether the reshift inhibit condition is satisfied, that is, whether the inertia phase is started in the case of FIGS. 11~13. In some cases, the reshift inhibit condition is met when the torque phase is started When the reshift inhibit condition is satisfied, and the answer of step 333 is affirmative, step 334 sets the reshift inhibit flag FRI to ON to start the reshift inhibition period. Then, step 335 examines whether the desired speed GPN is different from the command speed GPs to determine whether a reshift request is produced during the reshift inhibition period. If it is, step 326 increments the timer TM1 (by addition of ΔT) to measure the elapsed time from this reshift request, and then transfers the control to next step 337.

When step 333 concludes that the reshift inhibit condition is not satisfied, or when step 335 concludes that there is no reshift request, steps 334 and 336 are skipped, and step 348 resets the timer TM1 to zero, and then transfers the control to step 337.

Step 337 examines whether the inertia phase has come to an end by examining whether the effective gear ratio i (Nt/No) has reached the after-shift gear ratio. When the inertia phase is not yet ended, then the control is terminated directly. When the inertia phase is ended, step 338 determines the reshift delay time TA in accordance with the time measured by the timer TM1 by using the map as shown in FIG. 14. Next step 339 reads the after-inertia-phase process time TB, and step 340 measures the elapsed time from the end of the inertia phase by incrementing the timer TM2.

Step 341 examines whether the time measured by the timer TM2 is equal to or greater than the sum of the after-inertia-phase process time TB and the reshift delay time TA. If the measured time of timer TM2 is smaller than the sum, step 342 examines whether the measured time of timer TM2 (the elapsed time from the end of the inertia phase) is equal to or greater the after-inertia-phase process time TB. If the measured time of timer TM2 is smaller than TB, then the control is terminated directly. When the measured time of timer TM2 becomes equal to or greater than TB, step 343 makes judgment that the shift control is ended. Then, step 344 sets the current speed GPc equal to the desired speed GPN.

When the measured time of timer TM2 becomes equal to or greater than the sum of the after-inertia-phase process time TB and the reshift delay time TA, step 345 makes judgment that the shift control is ended. Then, step 346 sets the current speed GPc equal to the desired speed GPN. Step 347 resets the reshift inhibit flag FRI to the reshift permitting OFF state.

In the shift control process shown in FIGS. 15 and 16, a 4–3 downshift operation is performed in the normal manner when no reshift request is produced as shown in FIG. 11. When a reshift request is produced before a start of an inertia phase, a 4–2 jump downshift operation is carried out without delay as shown in FIG. 12. If a 3–2 reshift request is produced after the start of the inertia phase in the 4–3 downshift operation, the reshift operation is deferred as shown in FIG. 13.

Figure 17:
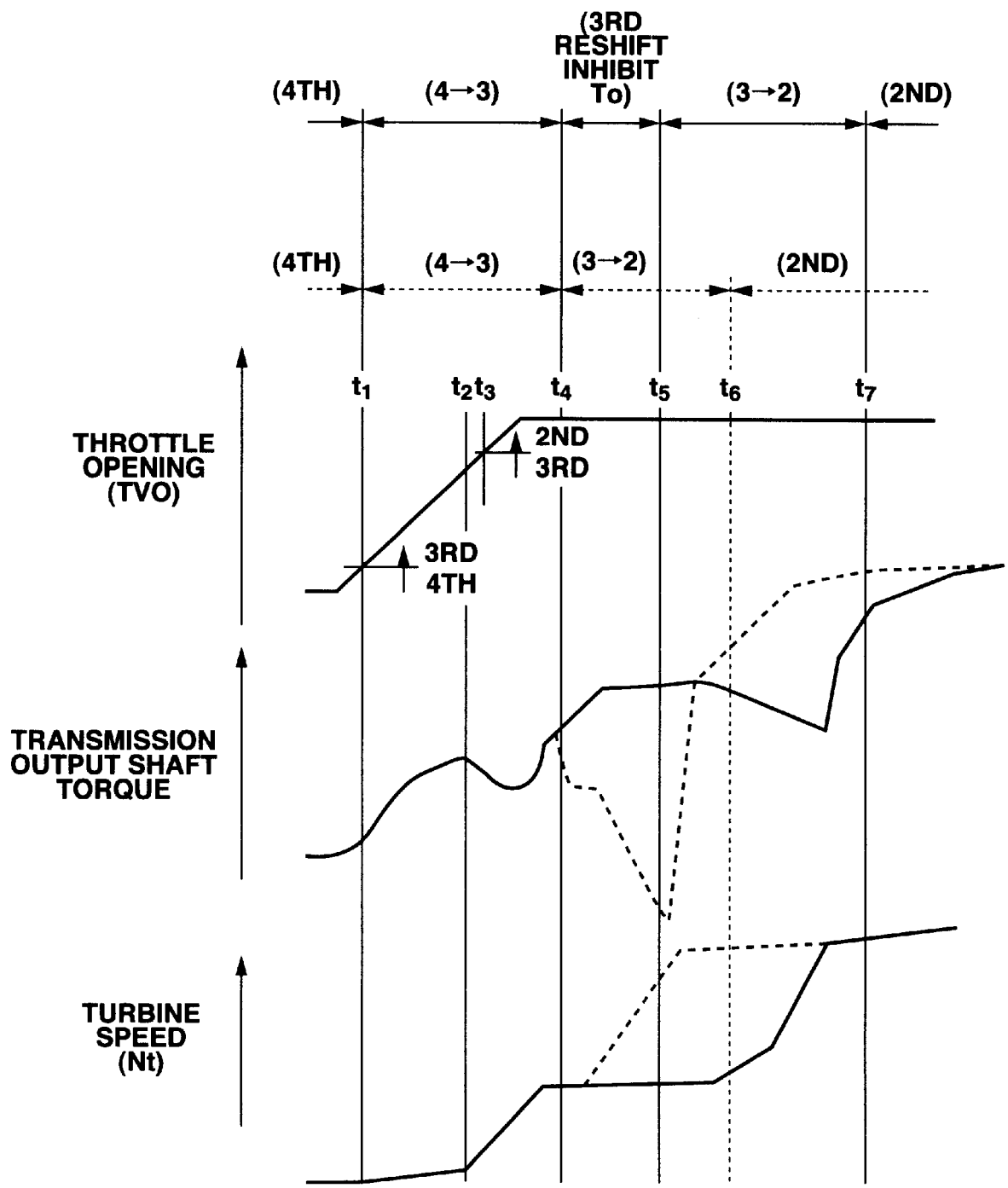
FIG. 17 is a time chart showing a reshift control operation performed by a reshift control system of an earlier technology.

FIG. 17 show a reshift control operation in an earlier technology. In this example, a 3–2 reshift request is produced at an instant t3 during an inertia phase, and this reshift control system holds the speed at 3rd by inhibiting a reshift operation during a reshift inhibit period of a length To from the end t4 of the inertia phase, and initiates the reshift operation at the end of the reshift inhibit period of To. The time length To is a delay time for delaying a reshift operation. In the examples of FIG. 17, the delay time To is constant, and this reshift control system can not prevent a shift shock as shown by broken line in FIG. 17.

In the preceding embodiments, the automatic transmission is a direct acting type automatic transmission capable of controlling the operating fluid pressures to the friction engagement elements directly and individually with solenoids. However, the present invention is also applicable to automatic transmissions of various other types.

This application is based on prior Japanese Patent Applications Nos. 2000-282333 filed Sep. 18, 2000; 2000-282325 filed on Sep. 18, 2000; and 2000-282339 filed on Sep. 18, 2000. The entire contents of these Japanese Patent Applications are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A reshift control apparatus for an automatic transmission comprising a plurality of friction elements arranged to be selectively engaged and disengaged to select one of gear ratios, and to perform a shift to another gear ratio by changeover of friction elements to be engaged, the reshift control apparatus comprising a shift controller so configured:

that the shift controller permits a reshift when another shift request is produced at a time during said shift;

that, in the case of a reshift in which an engagement side friction element in process of engagement in said shift is to be engaged continuously in said reshift, the shift controller makes an operating oil pressure for said engagement side friction element after a reshift command, equal to a value of an oil pressure to be given in a manner of time series if the reshift were a jump shift to a gear ratio reached by said reshift, initiated at the time of a command for said shift; and that the shift controller makes an operating oil pressure, after the reshift command, for a disengagement side friction element to be disengaged in said reshift, equal to a value of an oil pressure to be given in a manner of time series if the jump shift to the gear ratio reached by said reshift were initiated at the time of the command for said shift.

2. The reshift control apparatus as claimed in claim 1, wherein, in the case of a reshift performed by engagement changeover from an engagement side friction element in process of engagement in said shift to another engagement side friction element and disengagement of a specified disengagement side friction element, the shift controller performs engagement of the friction element to be engaged in the engagement changeover and disengagement of the specified disengagement side friction element from respective initial states after the reshift command.

3. The reshift control apparatus as claimed in claim 1, wherein the shift controller is configured to permit said reshift until an earlier one of a timing at which the shift controller detects that the engagement side friction element to be engaged in said shift terminates a loss stroke and starts to have an engagement capacity, and a timing at which an inertia phase starts so that an effective gear ratio represented by a transmission input and output speed ratio starts to vary from a before-shift gear ratio toward an after-shift gear ratio.

4. A reshift control apparatus for an automatic transmission comprising a friction element group of friction engaging elements to be selectively engaged and disengaged to select one of gear ratios, the reshift control apparatus comprising a shift controller configured:
- to govern a first shift operation to achieve a first shift to an after-first-shift gear ratio by setting a first shift target engagement pressure to engage a first shift engagement side element which is one element of the friction element group to be engaged for the first shift, and a second shift operation to achieve a second shift to an after-second-shift gear ratio different from the after-first-shift gear ratio by setting a second shift target engagement pressure to engage a second shift engagement side element which is one element of the friction element group to be engaged for the second shift and a second shift target disengagement pressure to disengage a second shift disengagement side element which is one element of the friction element group to be disengaged for the second shift;
- to allow a reshift to initiate the second shift operation during the first shift operation initiated in response to a first shift command when a reshift request for the second shift is produced at a time of the first shift operation;
- to make an actual fluid pressure for the second shift engagement side element after the time of the reshift command, equal to the second shift target engagement pressure varied with time from an intermediate state reached if the second shift operation were initiated at the time of the first shift command in the case of the second shift engagement side element being the same as the first shift engagement side element; and
- to make an actual fluid pressure for the second shift disengagement side element after the time of the reshift command, equal to the second shift target disengagement pressure varied with time from an intermediate state reached if the second shift operation were initiated at the time of the first shift command.

5. The reshift control apparatus as claimed in claim 4 wherein the shift controller is configured to govern the first shift operation by setting the first shift target engagement pressure to engage the first shift engagement side element, and by setting a first shift target disengagement pressure to disengage a first shift disengagement side element which is one element of the friction element group to be disengaged for the first shift; and to change an actual fluid pressure for the first shift disengagement side element to a level for full engagement in response to the reshift command.

6. The reshift control apparatus as claimed in claim 4 wherein, when the second shift engagement side element is not the same as the first shift engagement side element, the shift controller performs the engagement of the second shift engagement side element from an initial state and perform the disengagement of the second shift disengagement side element from an initial state in response to the reshift command.

7. The reshift control apparatus as claimed in claim 6 wherein the shift controller is configured to examine whether the second shift engagement side element for the second shift indicated by the reshift command is the same as the first shift engagement side element, and the shift controller performs a reshift operation in a first reshift mode to initiate the second shift operation from an intermediate state when the second shift engagement side element is the same as the first shift engagement side element and in a second reshift mode to initiate the second shift operation from an initial state when the second shift engagement side element is not the same as the first shift engagement side element.

8. The reshift control apparatus as claimed in claim 4, wherein the shift controller is configured to inhibit the reshift to initiate the second shift operation during the first shift operation if the reshift request is produced in a second stage of the first shift operation after the first stage of the first shift operation.

9. The reshift control apparatus as claimed in claim 8, wherein the shift controller inhibits the reshift after an end of a loss stroke in the first shift engagement side element is detected.

10. The reshift control apparatus as claimed in claim 9, wherein the shift controller inhibits the reshift after a start of an inertia phase in which the effective gear ratio in the form of a transmission input and output speed ratio varies from a before-shift ratio to the after first-shift gear ratio.

11. The reshift control apparatus as claimed in claim 9, wherein the reshift control apparatus further comprises an oil pressure sensing device to sense the end of the loss stroke in the first shift engagement side element by sensing the fluid pressure for the first shift engagement side element.

12. The reshift control apparatus as claimed in claim 4, wherein the shift controller is configured to delay a reshift operation if the reshift request is produced in a reshift inhibit stage of the first shift operation until an elapse of a delay time from an end of the first shift operation, and to decrease the delay time with increase in a measured time from the instant of the reshift request to the instant of an inertia phase end at which an effective gear ratio expressed as a transmission input and output speed ratio reaches the after-first-shift gear ratio.

13. The reshift control apparatus as claimed in claim 12, wherein the shift controller allows the reshift operation with no delay when the reshift request is produced before the start of the inertia phase and the start of a torque phase.

14. The reshift control apparatus as claimed in claim 13, wherein the shift controller regards, as the end of the first shift operation, the elapse of a predetermined time from the end of the inertia phase.

15. The reshift control apparatus as claimed in claim 12, wherein the delay time is positive when the measured time is in a shorter region and negative when the measured time is in a longer region, and the shift controller initiates the reshift operation before the end of the first shift operation when the delay time is negative.

16. A reshift control system for a vehicle, comprising:
- an automatic transmission comprising a gear train and a friction element group to determine a torque path in the gear train, to select one of gear ratios;
- a condition sensor to sense an operating condition of the vehicle; and
- a shift controller to govern a first shift operation in the automatic transmission from a before-shift gear ratio to an after-first-shift gear ratio, and a second shift operation in the automatic transmission from the before-shift gear ratio to an after-second-shift gear ratio,
- to produce a reshift command to command the second shift operation during the first shift operation in accordance with the operating condition; and
- to perform a reshift operation in response to the reshift command by terminating the first shift operation at an intermediate state without completing the first shift operation, and instead initiating the second shift operation from an intermediate state, wherein the shift controller performs the reshift operation in a first reshift mode by terminating the first shift operation at the intermediate state without completing the first shift operation, and instead initiating the second shift operation from the intermediate state when a friction engagement element to be engaged in the first shift operation is to be engaged continuously in the second shift operation, and in a second reshift mode by terminating the first shift operation at the intermediate state without completing the first shift operation, and instead initiating the second shift operation from an initial state when the friction engagement element to be engaged in the first shift operation is not to be engaged in the second shift operation.

17. The reshift control system as claimed in claim 16, wherein the shift controller is configured to start an inhibit period when at least one of an inertia phase and a torque phase is started and to inhibit the reshift operation until the end of the inhibition period, the inertia phase being a phase in which an effective gear ratio varies from a before-shift gear ratio to an after-shift gear ratio, and the torque phase being a phase in which a transmission output torque is out of a steady state.

18. The reshift control system as claimed in claim 16, wherein the shift controller is configured to govern the first shift operation by setting a predetermined first shift engagement pressure characteristic for determining a first shift engagement pressure as a function of an elapsed time from a start of the first shift operation and a predetermined first shift disengagement pressure characteristic for determining a first shift disengagement pressure as a function of the elapsed time from the start of the first shift operation, and to govern the second shift operation by setting a predetermined second shift engagement pressure characteristic for determining a second shift engagement pressure as a function of an elapsed time from a start of the second shift operation and a predetermined second shift disengagement pressure characteristic for determining a second shift disengagement pressure as a function of the elapsed time from the start of the second shift operation; and the shift controller is configured to respond to the reshift command commanding the second shift during the first shift operation in the first reshift mode, by changing the first shift engagement pressure from a pressure level determined by an elapsed time from the start of the first shift operation according to the first shift engagement pressure characteristic, to a pressure level determined by the elapsed time from the start of the first shift operation according to the second shift engagement pressure characteristic, and by changing the first shift disengagement pressure to a full engagement level for full engagement, and instead changing the second shift disengagement pressure from a full engagement level to a pressure level determined by the elapsed time from the start of the first shift operation, according to the second shift disengagement pressure characteristic.

19. The reshift control system as claimed in claim 18, wherein the shift controller is configured to respond to the reshift command commanding the second shift during the first shift operation in the second reshift mode, by changing the first shift engagement pressure from a pressure level determined by an elapsed time from the start of the first shift operation according to the first shift engagement pressure characteristic, to a full disengagement pressure level, and instead starting to vary the second shift engagement pressure from an initial state according to the second shift engagement pressure characteristic.

20. A reshift control process for a vehicle equipped with an automatic transmission comprising a gear train and a friction element group to determine a torque path in the gear train, to select one of gear ratios, the reshift control process comprising:

a step of producing a reshift command to command a second shift operation in the automatic transmission from a before-shift gear ratio to an after-second-shift gear ratio during a first shift operation in the automatic transmission from the before-shift gear ratio to an after-first-shift gear ratio in accordance with an operating condition of the vehicle;

a step of performing a reshift operation in a first reshift mode in response to the reshift command by terminating the first shift operation at an intermediate state without completing the first shift operation, and instead initiating the second shift operation from an intermediate state; and a step of performing the reshift operation in a second reshift mode in response to the reshift command by terminating the first shift operation at the intermediate state without completing the first shift operation, and instead initiating the second shift operation from an initial state when the friction engagement element to be engaged in the first shift operation is not to be engaged in the second shift operation.

21. A reshift control apparatus for an automatic transmission comprising a friction element group of friction engagement elements to be selectively engaged and disengaged to select one of gear ratios, the reshift control apparatus comprising:

a shift controller configured:
to produce a reshift request for a reshift to initiate a second shift operation during a first shift operation; and
to inhibit the reshift after an end of a loss stroke in a friction engagement element to be engaged in the first shift operation is detected; and an oil pressure sensing device to sense the end of the loss stroke in the friction engagement element to be engaged in the first shift operation.

22. A reshift control apparatus for an automatic transmission comprising a friction element group of friction engagement elements to be selectively engaged and disengaged to select one of gear ratios, the reshift control apparatus comprising a shift controller configured:

to produce a reshift request for a reshift to initiate a second shift operation during a first shift operation; and to delay a reshift operation if the reshift request is produced in a reshift inhibit stage of the first shift operation, until an elapse of a delay time from an end of the first shift operation; and to decrease the delay time with increase in a measured time from the instant of the reshift request to the instant of an inertia phase end at which an effective gear ratio expressed as a transmission input and output speed ratio reaches a level of the after-first-shift gear ratio.

* * * * *